(12) United States Patent  (10) Patent No.: US 11,599,388 B2
Itakura et al.  (45) Date of Patent: Mar. 7, 2023

(54) PROCESSING PROGRAM TO REARRANGE ORDER OF TASK IN STREAM PROCESSING

(71) Applicant: FUJITSU LIMITED, Kawasaki (JP)

(72) Inventors: Kota Itakura, Kawasaki (JP); Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 17/316,209

(22) Filed: May 10, 2021

(65) Prior Publication Data
US 2022/0019466 A1 Jan. 20, 2022

(30) Foreign Application Priority Data

Jul. 17, 2020 (JP) .............................. JP2020-123129

(51) Int. Cl.
G06F 9/46 (2006.01)
G06F 9/48 (2006.01)
G06F 9/38 (2018.01)
G06F 9/50 (2006.01)
G06F 9/52 (2006.01)

(52) U.S. Cl.
CPC .......... *G06F 9/4887* (2013.01); *G06F 9/3851* (2013.01); *G06F 9/5038* (2013.01); *G06F 9/52* (2013.01)

(58) Field of Classification Search
CPC .... G06F 9/4887; G06F 9/3851; G06F 9/5038; G06F 9/52
See application file for complete search history.

(56) References Cited

U.S. PATENT DOCUMENTS 10,310,896 B1  6/2019  Kichak et al.

FOREIGN PATENT DOCUMENTS

| JP | 2016-536690 A | 11/2016 |
| JP | 2017-524184 A | 8/2017 |
| JP | 2017-228257 | 12/2017 |
| WO | WO 2014/102996 A1 | 7/2014 |
| WO | WO 2015/070236 A1 | 5/2015 |
| WO | WO 2016/007399 A1 | 1/2016 |

OTHER PUBLICATIONS

Extended European Search Report dated Nov. 16, 2021, in European Application No. 21172458.8.

*Primary Examiner* — Gregory A Kessler
(74) *Attorney, Agent, or Firm* — Staas & Halsey LLP

(57) ABSTRACT

An information processing method for determining a pattern that indicates an arrangement order of the plurality of tasks from upstream to downstream of a stream is performed by a computer. The method includes acquiring a plurality of patterns to be candidates of an arrangement order of the plurality of tasks from upstream to downstream of the stream in a case of executing the plurality of tasks using a stream processing format; specifying, for each pattern of the plurality of acquired patterns, an amount of data to be reintroduced from one task of the plurality of tasks to another task located upstream side of the stream with respect to the one task; and determining the pattern from among the plurality of patterns based on the specified amount of data to be reintroduced for the each pattern.

13 Claims, 37 Drawing Sheets

| TASK | TRANSMISSION DESTINATION | PROCESSING CONTENT |
|---|---|---|
| a | b | (PROGRAM) |
| b | d,e,f | (PROGRAM) |
| c | b | (PROGRAM) |
| d | c | (PROGRAM) |
| e | f | (PROGRAM) |
| f |  | (PROGRAM) |
| g | d,f | (PROGRAM) |

| TASK | TRANSMISSION DESTINATION | STAGE |
|---|---|---|
| a | b | 0 |
| b | d,e,f | 2 |
| c | b | 5 |
| d | c | 3 |
| e | f | 4 |
| f |  | 6 |
| g | d,f | 1 |

| TYPE | INTERTASK MESSAGE |
|---|---|
| TASK | a |
| TIMESTAMP | 123465 |
| TRANSMISSION SOURCE STAGE | 2 |
| DATA | speed | 38 |
| | lat | 34.256 |
| | lon | 134.365 |

| TASK | TRANSMISSION/ RECEPTION TYPE | STAGE | DATA AMOUNT |
|---|---|---|---|
| a | RECEPTION | 2 | 35314 |
| | TRANSMISSION | 5 | 124124 |
| d | RECEPTION | 3 | 654678 |
| | | 2 | 48667 |

| ARRANGEMENT DESTINATION STAGE | RECEPTION COST | TRANSMISSION COST | SUM |
|---|---|---|---|
| 0 | 53213869 | 48979843 | 102193712 |
| 1 | 53213869 | 346876943 | 400090812 |
| 2 | 53213869 | 346876943 | 400090812 |
| 3 | 53213869 | 346876943 | 400090812 |
| 4 | 3428321 | 346876943 | 350350264 |
| 5 | 4521233 | 346876943 | 351398176 |
| 6 | 4521233 | 346876943 | 351398176 |

| TYPE | TASK MOVING INSTRUCTION | |
|---|---|---|
| TASK | a | |
| DESTINATION | TASK PROCESSING UNIT | TASK PROCESSING UNIT 1 |
| | STAGE | 3 |
| TIMESTAMP | 789453 | |
| TASK PROGRAM | (PROGRAM) | |

FIG. 14

| TYPE | TASK ACTIVATION INSTRUCTION |
|---|---|
| ACTIVATION TASK | a |
| TIMESTAMP | 789453 |

| TIMESTAMP | MESSAGE |
|---|---|
| 12346 | (INTERTASK MESSAGE) |
| 32456 | (INTERTASK MESSAGE) |

| ARRANGEMENT DESTINATION STAGE | RECEPTION COST | TRANSMISSION COST | SUM |
|---|---|---|---|
| 0 | 53213869 | 48979843 | 102193712 |
| 1 | 53213869 | 346876943 | 400090812 |
| 2 | 53213869 | 346876943 | 400090812 |
| 3 | 3428321 | 346876943 | 350305264 |
| 4 | 4521233 | 346876943 | 351398176 |
| 5 | 4521233 | 346876943 | 351398176 |
| 6 | | | |

MINIMUM (at row 0)

↑ CALCULATE COST WHEN REARRANGING TASK FOR EACH STAGE

2101

TRANSMISSION/RECEPTION MESSAGE AMOUNTS

RECEPTION SOURCE

| stage | DATA AMOUNT |
|---|---|
| 3 | 2347789 |

TRANSMISSION DESTINATION

| stage | DATA AMOUNT |
|---|---|
| 1 | 411786256 |

FIG. 28

$$\underbrace{\begin{pmatrix} B & F & B & \cdots & B \\ F & B & F & \cdots & B \\ B & F & B & \cdots & B \\ \vdots & \cdots & \ddots & \cdots & \vdots \\ F & \cdots & B & F & B \end{pmatrix} \begin{pmatrix} R_0 \\ \cdots \\ R_n \end{pmatrix}}_{\text{RECEPTION COST FOR EACH STAGE}} + \underbrace{\begin{pmatrix} B & F & B & \cdots & F \\ B & F & B & \cdots & F \\ B & \cdots & B & \cdots & B \\ \vdots & \cdots & \ddots & \cdots & \vdots \\ B & \cdots & B & F & B \end{pmatrix} \begin{pmatrix} S_0 \\ \cdots \\ S_n \end{pmatrix}}_{\text{TRANSMISSION COST FOR EACH STAGE}} = \left.\begin{pmatrix} C_0 \\ \cdots \\ C_k \\ \cdots \\ C_n \end{pmatrix}\right\}\text{SELECT STAGE WITH MINIMUM COST}$$

2801     2802     2800

PROCESSING PROGRAM TO REARRANGE ORDER OF TASK IN STREAM PROCESSING

CROSS-REFERENCE TO RELATED APPLICATION

This application is based upon and claims the benefit of priority of the prior Japanese Patent Application No. 2020-123129, filed on Jul. 17, 2020, the entire contents of which are incorporated herein by reference.

FIELD

The embodiment discussed herein is related to an information processing method and an information processing program.

BACKGROUND

There has been a stream processing system that sequentially processes data output from a data store by a plurality of tasks, using a stream processing format. Here, there are some cases where data processed by a task located downstream of the stream is desired to be used by another task located upstream of the stream. In this case, the data processed by the task located downstream of the stream goes through an outside of the stream processing system and is reintroduced to another task located upstream of the stream.

For example, there is a past technique for identifying one or more virtual processing agents who are interested in an issued event and have not explicitly applied for registration. Furthermore, for example, there is a technique for forming a worker node for executing an operation on a received record. Furthermore, for example, there is a technique for distributing a processing load in a plurality of calculation nodes, predicting a communication load caused by the processing load, and determining a network topology between calculation nodes based on a prediction result.

Japanese National Publication of International Patent Application No. 2017-524184, Japanese National Publication of International Patent Application No. 2016-536690, and International Publication Pamphlet No. WO 2014/102996 are disclosed as related art.

SUMMARY

According to an aspect of the embodiments, an information processing method to be performed by a computer, the method including: acquiring a plurality of patterns to be candidates of an arrangement order of a plurality of tasks from upstream to downstream of a stream in a case of executing the plurality of tasks using a stream processing format; specifying, for each pattern of the plurality of acquired patterns, an amount of data to be reintroduced from one task of the plurality of tasks to another task located upstream side of the stream with respect to the one task; and determining a pattern that indicates the arrangement order of the plurality of tasks from upstream to downstream of the stream from among the plurality of patterns based on the specified amount of data to be reintroduced for the each pattern.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an explanatory diagram illustrating an example of content stored in a job arrangement configuration information management table 700;

FIG. 9 is an explanatory diagram illustrating an example of content stored in an inter-task message 900;

FIG. 11 is an explanatory diagram illustrating an example of content stored in a task statistical information management table 1100;

FIG. 12 is an explanatory diagram illustrating an example of content stored in a cost information management table 1200;

FIG. 14 is an explanatory diagram illustrating an example of content stored in a task activation instruction message 1400;

FIG. 15 is an explanatory diagram illustrating an example of content stored in a standby message information management table 1500;

FIG. 23 is an explanatory diagram (No. 3) illustrating an example of the operation of the information processing device 100;

FIG. 28 is an explanatory diagram (No. 4) illustrating a specific example of the operation of the information processing device 100;

DESCRIPTION OF EMBODIMENTS

The conventional techniques may increase the processing load on the stream processing system. For example, the data reintroduced against the stream has a larger processing load on the stream processing system than data transmitted along the stream, and the processing load applied on the stream processing system tends to increase as the amount of data to be reintroduced increases.

In one aspect, the present embodiment aims to reduce the processing load.

Hereinafter, embodiments of an information processing method and an information processing program will be described in detail with reference to the drawings.

(Example of Information Processing Method According to Embodiment)

Figure 1:
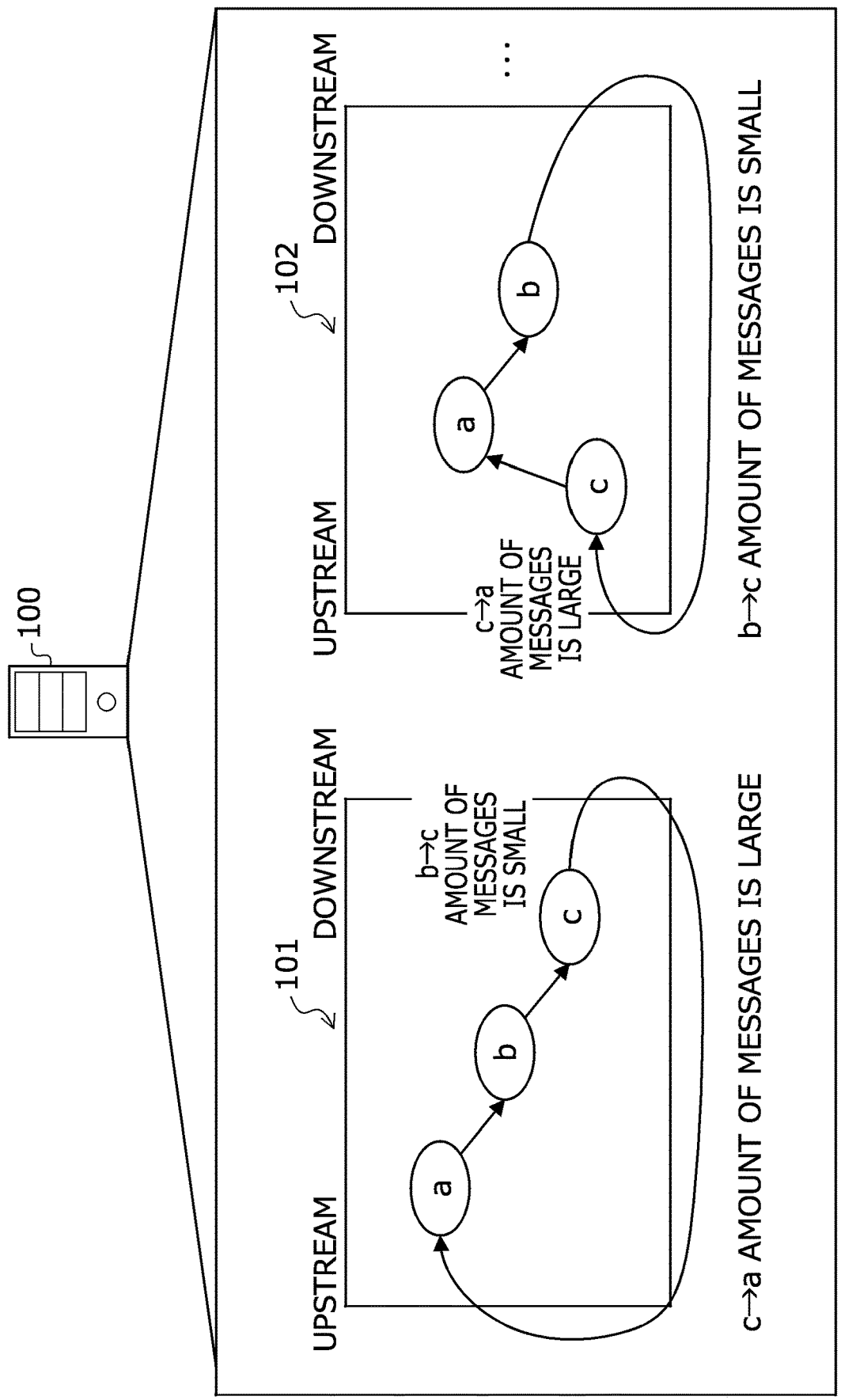
FIG. 1 is an explanatory diagram illustrating an example of an information processing method according to an embodiment.

FIG. 1 is an explanatory diagram illustrating an example of an information processing method according to an embodiment. An information processing device 100 is a computer for determining an arrangement order of a plurality of tasks from upstream to downstream of a stream in a case of executing a plurality of tasks using a stream processing format.

The information processing device 100 is, for example, a server, a personal computer (PC), or the like.

There has been a stream processing system that sequentially processes data output from a data store by a plurality of tasks, using a stream processing format. The stream processing system is formed by a plurality of nodes. A node is a computer that executes a task.

Here, there are some cases where data processed by a task located downstream of the stream is desired to be used by another task located upstream of the stream. For example, a case of executing an actor model system using the stream processing system is conceivable.

The actor model system is a system that executes a desired function by elements called actors interacting with each other, each of the elements having a behavior and a state inside and exchanging a message with another element. A specific example of the actor system will be described later with reference to FIG. 3.

However, the stream processing system has a restriction of not allowing a stream to form a closed circuit. Specifically, this restriction is defined in consideration of a fact that a special message called a barrier marker is sent along the stream and an internal state of the node is saved as a countermeasure against a failure.

Therefore, the data processed by a task located downstream of the stream goes through an outside of the stream processing system and needs to be reintroduced to another task located upstream of the stream. Here, the data reintroduced through the outside of the stream processing system against the stream tends to have a larger processing load on the stream processing system than data transmitted along the stream.

Therefore, there is a problem of increasing the processing load applied on the stream processing system and the processing time in the stream processing system. For example, the processing load applied on the stream processing system and the processing time in the stream processing system tend to increase as the amount of data to be reintroduced increases.

Furthermore, in a case where a use state of the stream processing system changes in real time, there is a problem that it is difficult to set the stream in advance such that the processing load to be applied on the stream processing system becomes relatively small. For example, in this case, it may be difficult to consider in advance whether it is favorable to pass data along the stream between tasks and to pass data through outside the stream processing system against the stream between tasks.

Therefore, in the present embodiment, an information processing method capable of determining an arrangement order of a plurality of tasks by considering an amount of data to be reintroduced between tasks for each candidate of the arrangement order of a plurality of tasks from upstream to downstream of a stream will be described. According to the information processing method, the processing load applied on the stream processing system and the processing time in the stream processing system can be reduced.

(1-1) The information processing device 100 acquires a plurality of patterns to be candidates for the arrangement order of a plurality of tasks from upstream to downstream of a stream in the case of executing the plurality of tasks using the stream processing format. In the example of FIG. 1, the information processing device 100 acquires patterns 101 and 102, and the like. The pattern 101 indicates, for example, a candidate for the arrangement order of arranging the tasks in order of a task a, a task b, and a task c from upstream to downstream of the stream. In the pattern 101, data is reintroduced from the task c to the task a. The pattern 102 indicates, for example, a candidate for the arrangement order of arranging the tasks in order of the task c, the task a, and the task b from upstream to downstream of the stream. In the pattern 102, data is reintroduced from the task b to the task c.

(1-2) The information processing device 100 specifies, for each of the plurality of acquired patterns, an amount of data to be reintroduced from one task of the plurality of tasks to another task located upstream side of the stream with respect to the one task. In the example of FIG. 1, the information processing device 100 specifies the amount of data to be reintroduced from the task c to the task a for the pattern 101, the amount of data to be reintroduced from the task b to the task c for the pattern 102, and the like.

(1-3) The information processing device 100 determines the arrangement order of the plurality of tasks from upstream to downstream of the stream from among the plurality of patterns based on the specified amount of data to be reintroduced for each of the patterns. For example, the information processing device 100 determines the pattern 102 having a relatively small amount of data to be reintroduced between the patterns 101 and 102 as the pattern indicating the arrangement order of the plurality of tasks from upstream to downstream of the stream.

Thereby, the information processing device 100 can determine the pattern having a relatively small processing load applied on the stream processing system and a relatively short processing time in the stream processing system. Therefore, the information processing device 100 can reduce the processing load applied on the stream processing system and the processing time in the stream processing system.

Thereafter, the information processing device 100 may cause a stream processing platform to execute the plurality of tasks in a state of arranging the plurality of tasks from upstream to downstream of the stream according to the determined pattern. Thereby, the information processing device 100 can cause the stream processing platform to execute the plurality of tasks while suppressing the increase in the processing load applied on the stream processing system and the processing time in the stream processing system.

Here, the case in which the information processing device 100 causes the stream processing platform to execute the plurality of tasks in the state of arranging the plurality of tasks from upstream to downstream of the stream according to the determined pattern has been described. However, the embodiment is not limited to this case. For example, there may be some cases where the information processing device 100 provides the determined pattern to another computer, and the another computer causes the stream processing platform to execute the plurality of tasks.

(Example of Information Processing System 200)

Next, an example of an information processing system 200 to which the information processing device 100 illustrated in FIG. 1 will be described with reference to FIG. 2.

Figure 2:
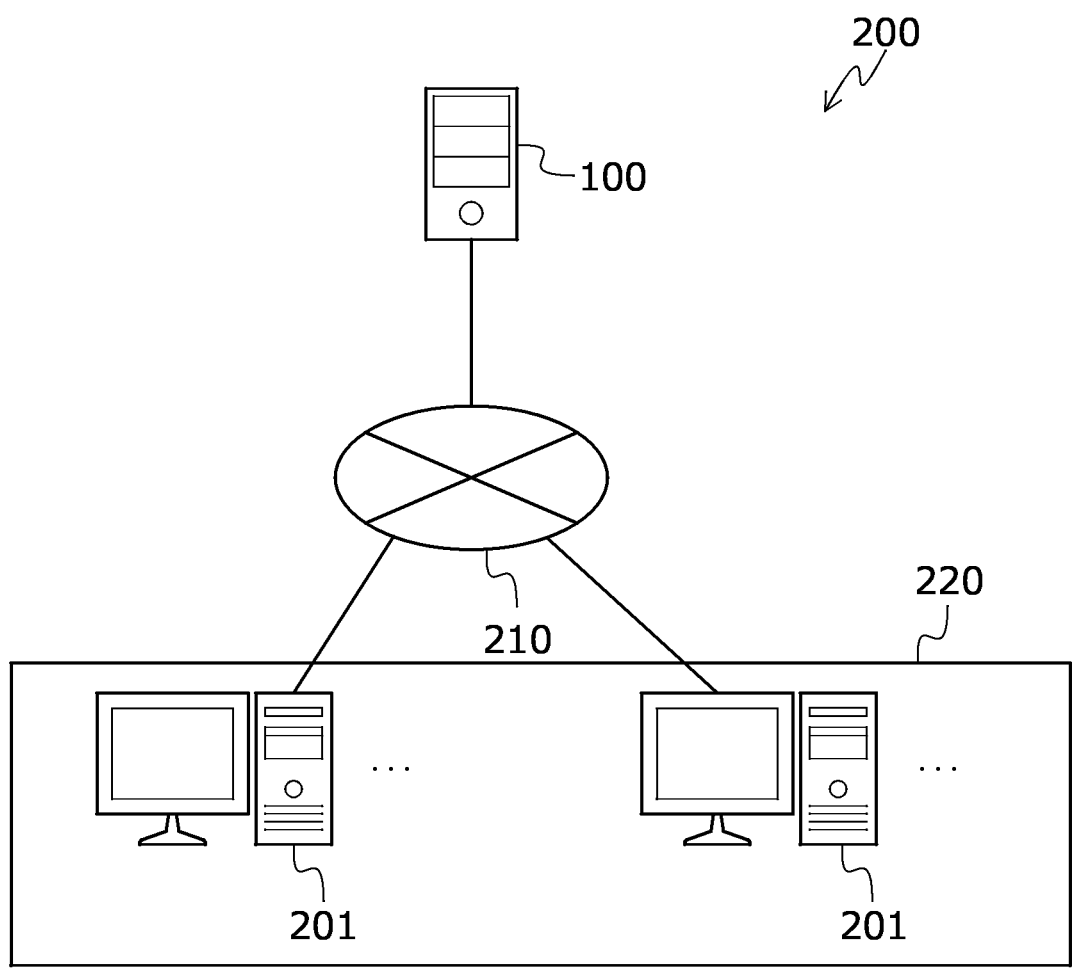
FIG. 2 is an explanatory diagram illustrating an example of an information processing system 200.

FIG. 2 is an explanatory diagram illustrating an example of the information processing system 200. In FIG. 2, the information processing system 200 includes the information processing device 100 and a plurality of node devices 201.

In the information processing system 200, the information processing device 100 and the node device 201 are connected via a wired or wireless network 210. The network 210 is, for example, a local area network (LAN), a wide area network (WAN), the Internet, or the like.

The node device 201 is a computer that executes tasks. The plurality of node devices 201 executes an actor system. An example of the actor system will be specifically described later with reference to FIG. 3. The plurality of node devices 201 form a stream processing platform 220. The stream processing platform 220 implements the stream processing system. An example of the stream processing system will be specifically described with reference to FIG. 4. The node device 201 is, for example, a server, a personal computer (PC), a tablet terminal, a smartphone, a wearable terminal, an electronic device, an Internet of Things (IoT) device, or the like.

The information processing device 100 determines the arrangement order of a plurality of tasks from upstream to downstream of a stream. The information processing device 100 causes the stream processing platform 220 to execute the plurality of tasks in the state of arranging the plurality of tasks from upstream to downstream of the stream according to the determined arrangement order. The information processing device 100 is, for example, a server, a personal computer (PC), a tablet terminal, a smartphone, a wearable terminal, or the like. The information processing device 100 may be a microcomputer, a programmable logic controller (PLC), or the like.

(Example of Actor System 300)

Next, an example of an actor system 300 implemented by the information processing system 200 illustrated in FIG. 2 will be described with reference to FIG. 3.

Figure 3:
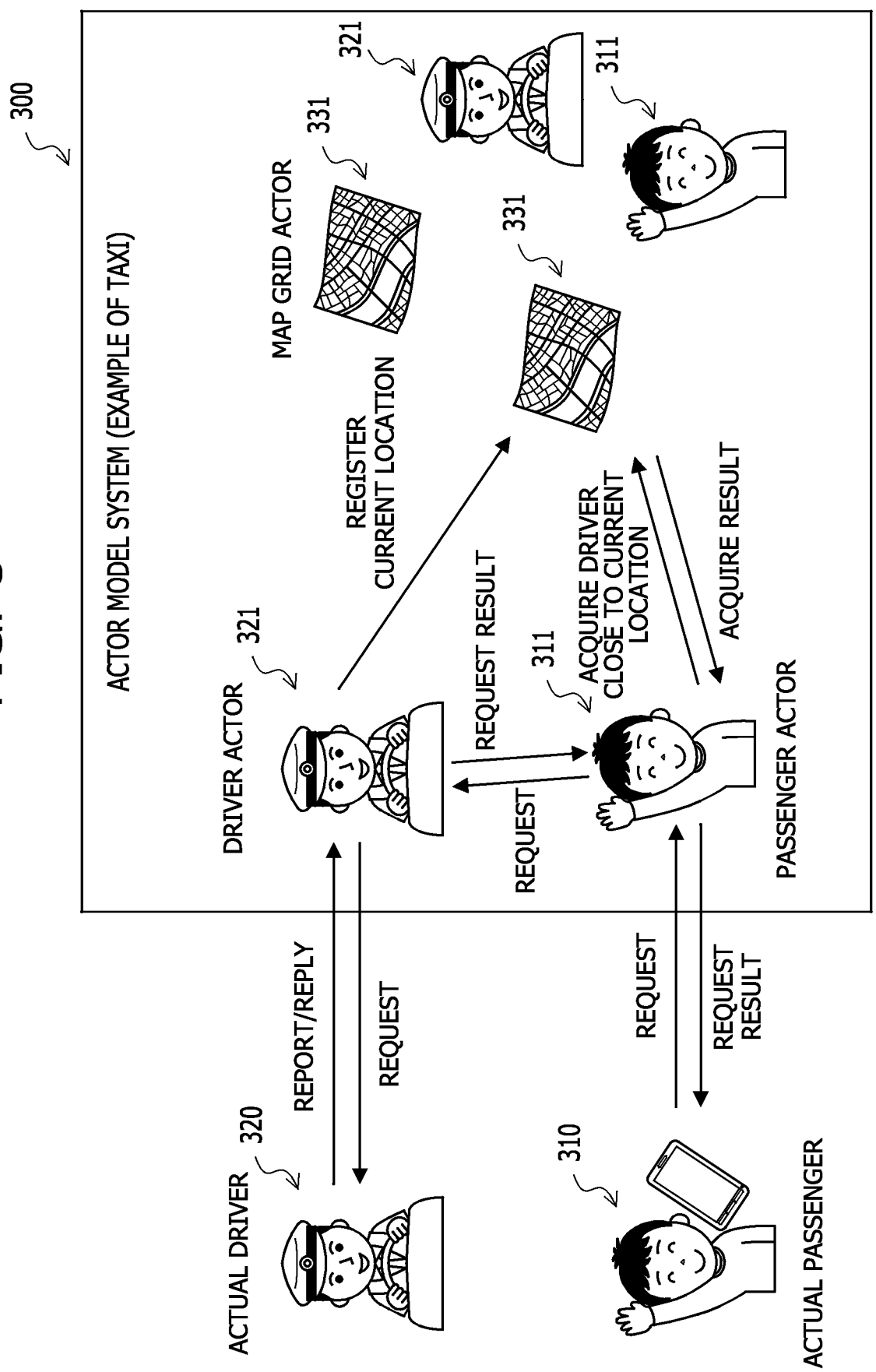
FIG. 3 is an explanatory diagram illustrating an example of an actor system 300.

FIG. 3 is an explanatory diagram illustrating an example of the actor system 300. In FIG. 3, the actor system 300 includes a passenger actor 311 corresponding to an actual passenger 310, a driver actor 321 corresponding to an actual driver 320, and a map grid actor 331.

The driver 320 inputs a report of the driver's current location to the driver actor 321. The driver actor 321 registers the current location of the driver 320 in the map grid actor 331. The passenger 310 inputs a request to dispatch a taxi to the passenger actor 311. The passenger actor 311 transmits the request to acquire the driver 320 close to the current location of the passenger actor 311 to the map grid actor 331. When receiving the request, the map grid actor 331 acquires the driver 320 close to the current location of the passenger 310, and transmits an acquisition result to the passenger actor 311.

The passenger actor 311 transmits a request input based on the acquisition result to the driver actor 321 corresponding to the driver 320 close to the current location of the passenger 310. The driver actor 321 presents the request to the driver 320. The driver 320 inputs a reply notifying that the driver 320 will respond to the request to the driver actor 321. The driver actor 321 transmits a reply notifying that the driver 320 will respond to the request to the passenger actor 311 as a request result. The passenger actor 311 presents the request result to the passenger 310. As described above, in the actor system 300, the data flow may form a closed circuit.

(Example of Stream Processing System 400)

Next, an example of a stream processing system 400 implemented by the plurality of node devices 201 in the information processing system 200 illustrated in FIG. 2 will be described with reference to FIG. 4.

Figure 4:
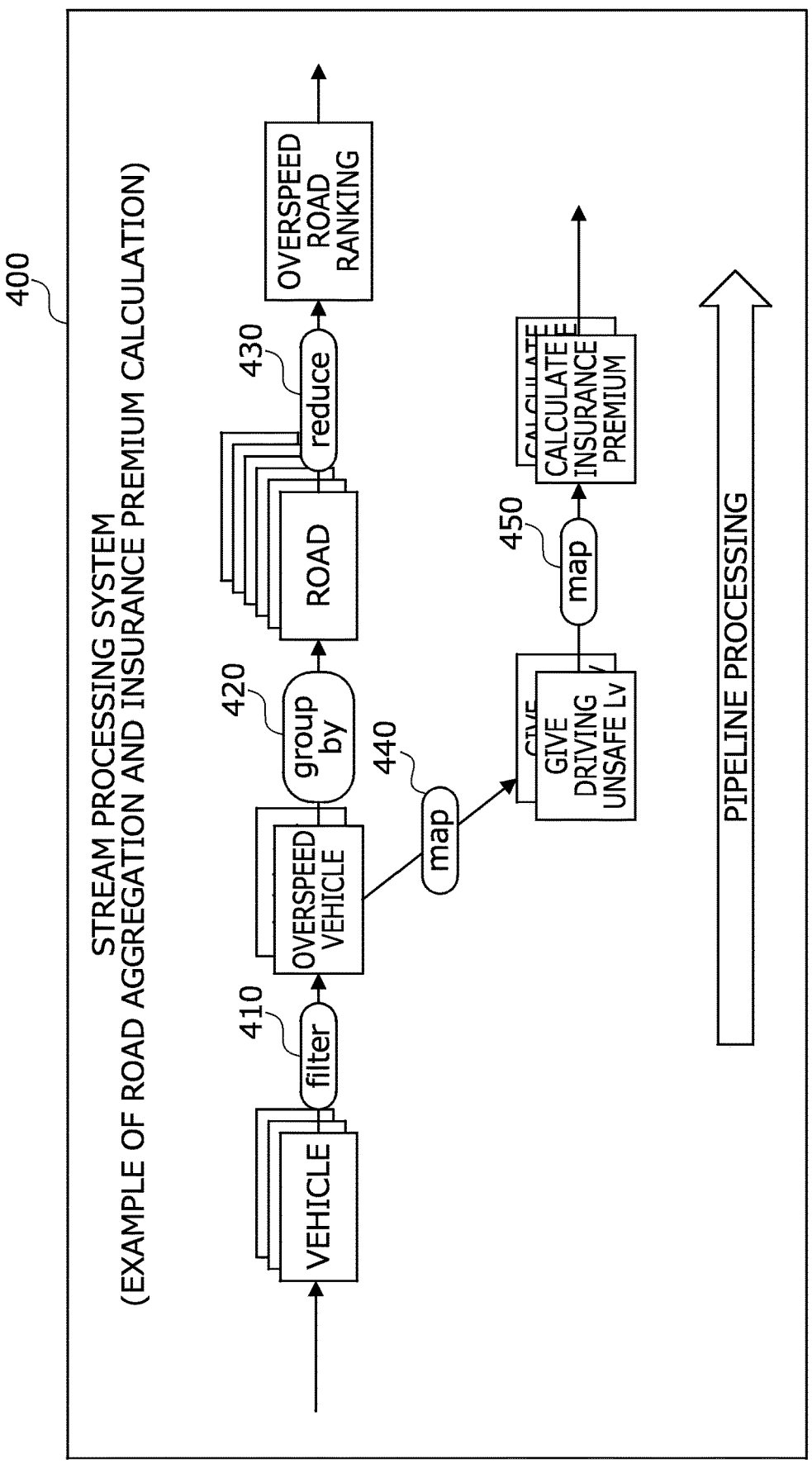
FIG. 4 is an explanatory diagram illustrating an example of a stream processing system 400.

FIG. 4 is an explanatory diagram illustrating an example of a stream processing system 400. In FIG. 4, the stream processing system 400 includes a plurality of tasks 410, 420, 430, 440, and 450. The task 410 receives vehicle data indicating a driver, speed, position, and the like of a vehicle, detects an overspeed vehicle, and transmits overspeed vehicle data indicating a driver, speed, position, and the like of the overspeed vehicle to the tasks 420 and 430.

The task 420 receives the overspeed vehicle data and transmits road data indicating a road including the position of the overspeed vehicle to the task 430. The task 430 receives the road data, arranges roads in descending order of the number of overspeed vehicles, and outputs an overspeed road ranking. The task 440 receives the overspeed vehicle data, gives a driving unsafe level to each vehicle driver, and transmits driving unsafe level data indicating the driving unsafe level of the vehicle driver to the task 450. The task 450 receives the driving unsafe level data, calculates insurance premiums for each vehicle driver, and outputs the insurance premiums.

In this way, the stream processing system 400 causes the data to flow in one direction through the plurality of tasks 410, 420, 430, 440, and 450. Here, for example, in a case where use of the driving unsafe level data in the task 410 is desired, the driving unsafe level data is reintroduced into the task 410 via the outside of the stream processing system 400.

(Hardware Configuration Example of Information Processing Device 100)

Next, a hardware configuration example of the information processing device 100 will be described with reference to FIG. 5.

Figure 5:
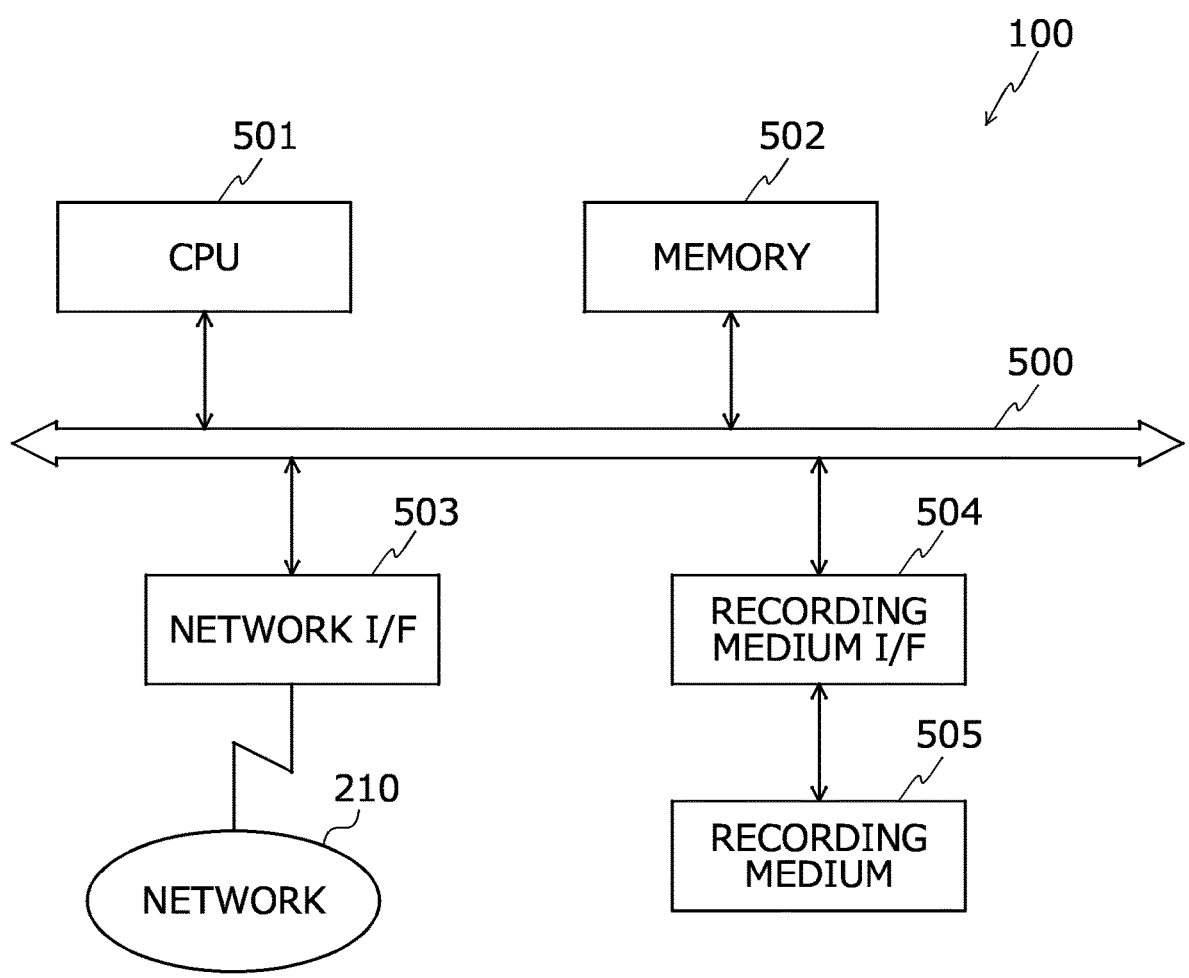
FIG. 5 is a block diagram illustrating a hardware configuration example of an information processing device 100.

FIG. 5 is a block diagram illustrating a hardware configuration example of the information processing device 100. In FIG. 5, the information processing device 100 includes a central processing unit (CPU) 501, a memory 502, a network interface (I/F) 503, a recording medium I/F 504, and a recording medium 505. Furthermore, each of the components is connected to one another via a bus 500.

Here, the CPU 501 performs overall control of the information processing device 100. The memory 502 includes, for example, a read only memory (ROM), a random access memory (RAM), a flash ROM, or the like. Specifically, for example, the flash ROM or the ROM stores various programs, while the RAM is used as a work area for the CPU 501. The programs stored in the memory 502 are loaded into the CPU 501 to cause the CPU 501 to execute coded processing.

The network I/F 503 is connected to the network 210 through a communication line, and is connected to another computer through the network 210. Then, the network I/F 503 manages an interface between the network 210 and an inside, and controls input and output of data to and from another computer. The network I/F 503 is, for example, a modem, a LAN adapter, or the like.

The recording medium I/F 504 controls read and write of data to and from the recording medium 505 under the control of the CPU 501. The recording medium I/F 504 is, for example, a disk drive, a solid state drive (SSD), a universal serial bus (USB) port, or the like. The recording medium 505 is a nonvolatile memory that stores data written under the control of the recording medium I/F 504. The recording medium 505 is, for example, a disk, a semiconductor memory, a USB memory, or the like. The recording medium 505 may be removably installed on the information processing device 100.

The information processing device 100 may include, for example, a keyboard, a mouse, a display, a printer, a scanner, a microphone, a speaker, or the like in addition to the above-described components. Furthermore, the information processing device 100 may include, for example, a plurality of the recording media I/F 504 and the recording media 505. Furthermore, the information processing device 100 needs not include, for example, the recording medium I/F 504 and the recording medium 505.

In the information processing system 200, various tables, various types of information, and various messages to be described later in FIGS. 6 to 16 are used by the information processing device 100 or the node device 201, for example. Here, the description will move onto FIGS. 6 to 16, and the various tables, various types of information, and various messages used by the information processing device 100 or the node device 201 in the information processing system 200 will be described.

(Content Stored in Job Information 600)

First, an example of content stored in job information 600 will be described with reference to FIG. 6.

Figure 6:
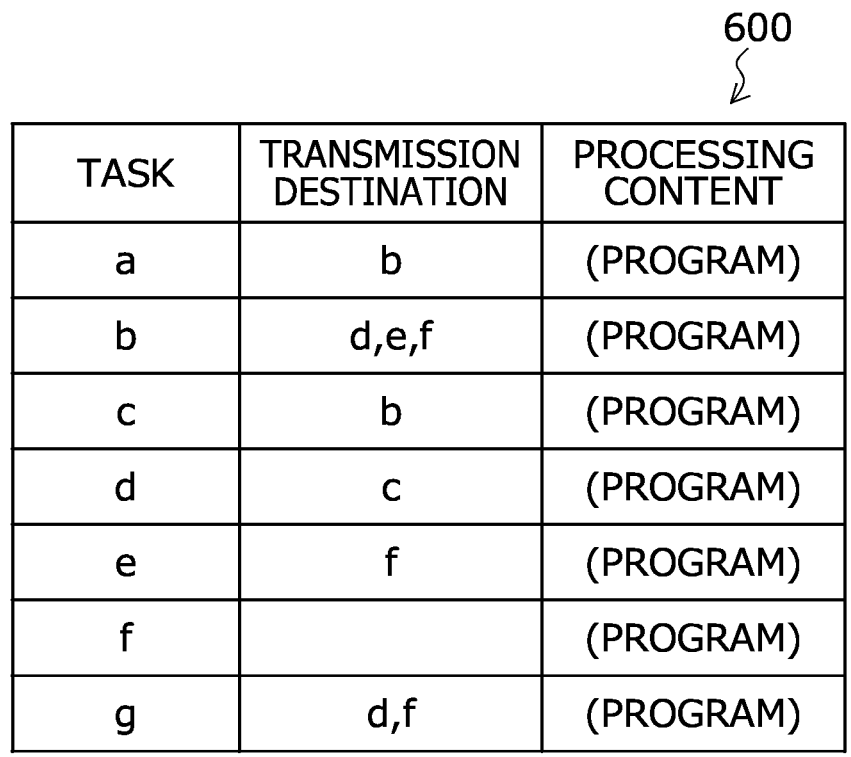
FIG. 6 is an explanatory diagram illustrating an example of content stored in job information 600.

FIG. 6 is an explanatory diagram illustrating an example of content stored in the job information 600. As illustrated in FIG. 6, the job information 600 has fields for task, transmission destination, and processing content. In the job information 600, information is set in each field for each task.

In the task field, identification information for identifying the task is set. In the transmission destination field, identification information for identifying a task to which data is transmitted from the task is set. In the processing content field, a task program for executing the task is set.

(Content Stored in Job Arrangement Configuration Information Management Table 700)

Next, an example of content stored in a job arrangement configuration information management table 700 will be described with reference to FIG. 7. The job arrangement configuration information management table 700 is implemented by a storage area such as the memory 502 or the recording medium 505 of the information processing device 100 illustrated in FIG. 5, for example.

FIG. 7 is an explanatory diagram illustrating an example of content stored in the job arrangement configuration information management table 700. As illustrated in FIG. 7, the job arrangement configuration information management table 700 has fields for task, transmission destination, and stage. The job arrangement configuration information management table 700 stores job arrangement configuration information as a record by setting information in each field for each task.

In the task field, identification information for identifying the task is set. In the transmission destination field, identification information for identifying a task to which data is transmitted from the task is set. In the stage field, a number for identifying a stage on which the task is arranged among a plurality of stages from upstream to downstream of the stream is set. A smaller number indicates an upstream stage.

(Content Stored in Task Program Management Table 800)

Next, an example of content stored in a task program management table 800 will be described with reference to FIG. 8. The task program management table 800 is implemented by the storage area such as the memory 502 or the recording medium 505 of the information processing device 100 illustrated in FIG. 5, for example.

Figure 8:
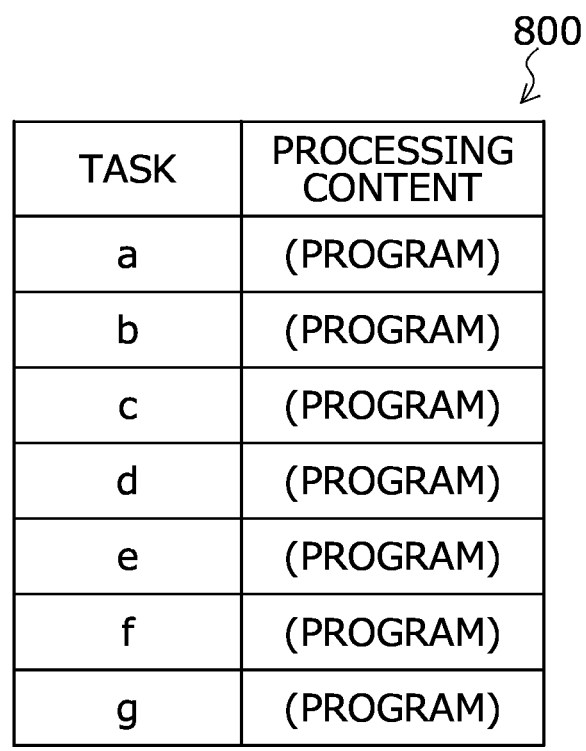
FIG. 8 is an explanatory diagram illustrating an example of content stored in a task program management table 800.

FIG. 8 is an explanatory diagram illustrating an example of content stored in a task program management table 800. As illustrated in FIG. 8, the task program management table 800 has fields for task and processing content. The task program management table 800 stores task program information as a record by setting information in each field for each task.

In the task field, identification information for identifying the task is set. In the processing content field, a task program for executing the task is set.

(Content Stored in Inter-Task Message 900)

Next, an example of content stored in an inter-task message 900 will be described with reference to FIG. 9.

FIG. 9 is an explanatory diagram illustrating an example of content stored in the inter-task message 900. As illustrated in FIG. 9, the inter-task message 900 has fields for type, task, timestamp, transmission source stage, and data. In the intertask message 900, message information is stored as a record by setting information in each field.

In the type field, a type of a message is set. In the task field, identification information for identifying a task as a destination is set. In the timestamp field, a timestamp indicating the time point when the message has been generated is set. In the transmission source stage field, a number for identifying a stage in which a task as a transmission source is present is set. In the data field, data is set.

The data fields include, for example, fields for speed, lat, and lon. In the speed field, a speed of a vehicle is set, for example. In the lat field, latitude indicating a position of the vehicle is set. In the lon field, longitude indicating a position of the vehicle is set.

(Content Stored in Statistics Acquisition Instruction Message 1000)

Next, an example of content stored in a statistics acquisition instruction message 1000 will be described with reference to FIG. 10.

Figure 10:
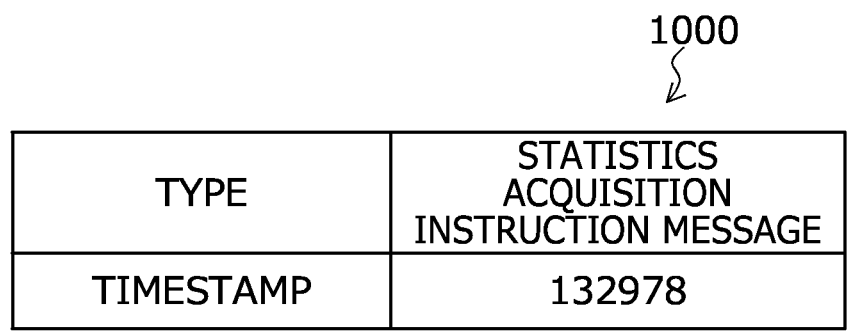
FIG. 10 is an explanatory diagram illustrating an example of content stored in statistics acquisition instruction message 1000.

FIG. 10 is an explanatory diagram illustrating an example of content stored in the statistics acquisition instruction message 1000. As illustrated in FIG. 10, the statistics acquisition instruction message 1000 has fields for type and timestamp. In the statistics acquisition instruction message 1000, message information is stored as a record by setting information in each field.

In the type field, a type of a message is set. In the timestamp field, a timestamp indicating the time point when the message has been generated is set.

(Content Stored in Task Statistical Information Management Table 1100)

Next, an example of content stored in a task statistical information management table 1100 will be described with reference to FIG. 11. The task statistical information management table 1100 is implemented by the storage area such as the memory 502 or the recording medium 505 of the information processing device 100 illustrated in FIG. 5, for example.

FIG. 11 is an explanatory diagram illustrating an example of content stored in the task statistical information management table 1100. As illustrated in FIG. 11, the task statistical information management table 1100 has fields for task, transmission/reception type, stage, and data amount. The task statistical information management table 1100 stores task statistical information as a record by setting information in each field for each task.

In the task field, identification information for identifying the task is set. In the transmission/reception type field, information indicating whether the task statistical information is related to the type of either transmission from the task or reception by the task is set. In the stage field, a number for identifying a stage for the type of either transmission from the task or reception by the task is set. In the data amount field, either the amount of data to transmitted from the task or the amount of data to be received by the task is set. Specifically, in FIG. 11, the task a is receiving from the stage 2 and transmitting to the stage 5, and the task d is receiving from the stage 3 and from the stage 2 but not transmitting to any stage.

(Content Stored in Cost Information Management Table 1200)

Next, an example of content stored in a cost information management table 1200 will be described with reference to FIG. 12. The cost information management table 1200 is implemented by the storage area such as the memory 502 or the recording medium 505 of the information processing device 100 illustrated in FIG. 5, for example.

FIG. 12 is an explanatory diagram illustrating an example of content stored in the cost information management table 1200. As illustrated in FIG. 12, the cost information management table 1200 has fields for arrangement destination stage, reception cost, transmission cost, and sum. In the cost information management table 1200, cost information is stored as a record by setting information in each field for each stage.

In the arrangement destination stage field, a number for identifying a stage to be an arrangement destination in which the task is arranged is set. In the reception cost field, a value indicating the cost for receiving data in the case where the task is arranged in the arrangement destination stage is set. In the transmission cost field, a value indicating the cost for transmitting data in the case where the task is arranged in the arrangement destination stage is set. In the sum field, the sum of the cost for receiving data and the cost for transmitting data is set.

(Content Stored in Task Moving Instruction Message 1300)

Next, an example of content stored in a task moving instruction message 1300 will be described with reference to FIG. 13.

Figure 13:
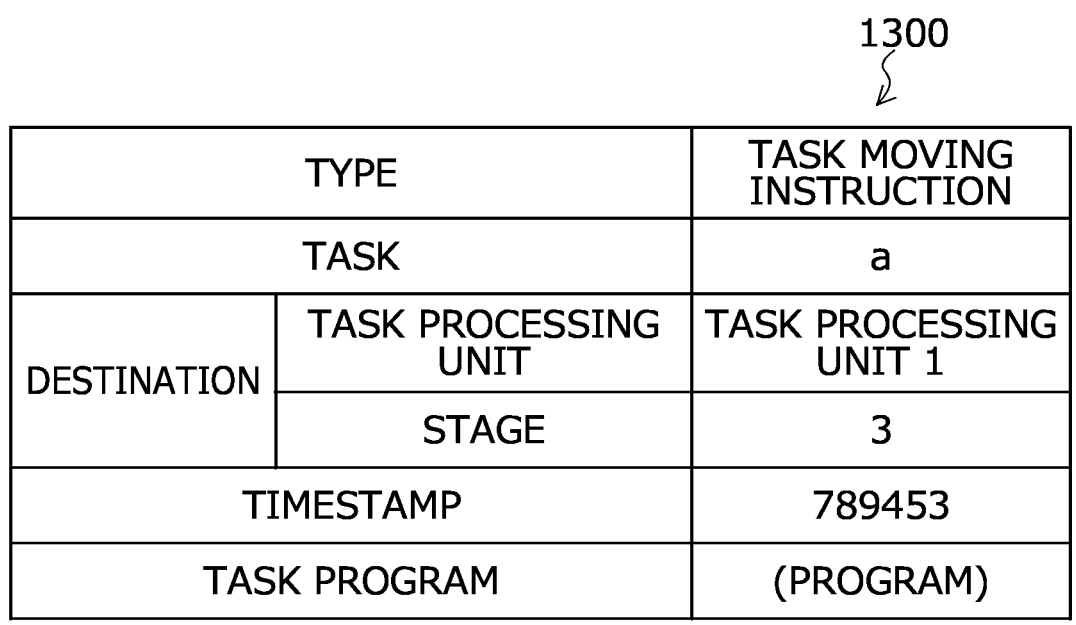
FIG. 13 is an explanatory diagram illustrating an example of content stored in a task moving instruction message 1300.

FIG. 13 is an explanatory diagram illustrating an example of content stored in the task moving instruction message 1300. As illustrated in FIG. 13, the task moving instruction message 1300 has fields for type, task, destination, timestamp, and task program. In the task moving instruction message 1300, message information is stored as a record by setting information in each field.

In the type field, a type of a message is set. In the task field, identification information for identifying the task is set. In the destination field, destination information for enabling specification of the destination of the task is set. The destination field has, for example, fields for task processing unit and stage. In the task processing unit field, identification information for identifying the node device 201 to be a physical destination of the task is set. In the stage field, a number for identifying a stage to be a logical destination of the task is set. In the timestamp field, a timestamp indicating the time point when the message has been generated is set. In the task program field, a task program for executing the task is set.

(Content Stored in Task Activation Instruction Message 1400)

Next, an example of content stored in a task activation instruction message 1400 will be described with reference to FIG. 14.

FIG. 14 is an explanatory diagram illustrating an example of content stored in the task activation instruction message 1400. As illustrated in FIG. 14, the task activation instruction message 1400 has fields for type, activation task, and timestamp. In the task activation instruction message 1400, message information is stored as a record by setting information in each field.

In the type field, a type of a message is set. In the activation task field, identification information for identifying a task to be activated is set. In the timestamp field, a timestamp indicating the time point when the message has been generated is set.

(Content Stored in Standby Message Information Management Table 1500)

Next, an example of content stored in a standby message information management table 1500 will be described with reference to FIG. 15. The standby message information management table 1500 is implemented by a storage area such as a memory 1702 or a recording medium 1705 of the node device 201 to be described later in FIG. 17, for example.

FIG. 15 is an explanatory diagram illustrating an example of content stored in the standby message information management table 1500. As illustrated in FIG. 15, the standby message information management table 1500 has fields for timestamp and message. In the standby message information management table 1500, standby message information is stored as a record by setting information in each field for each message.

In the timestamp field, a timestamp indicating the time point when the message has been generated is set. In the message field, the message is set.

(Content Stored in Activation-Waiting Information Management Table 1600)

Next, an example of content stored in an activation-waiting information management table 1600 will be described with reference to FIG. 16. The activation-waiting information management table 1600 is implemented by the storage area such as the memory 1702 or the recording medium 1705 of the node device 201 to be described later in FIG. 17, for example.

Figure 16:
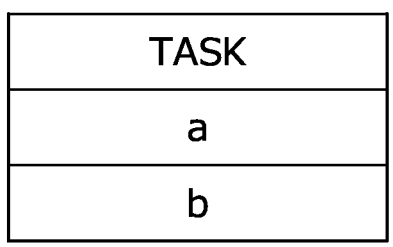
FIG. 16 is an explanatory diagram illustrating an example of content stored in an activation-waiting information management table 1600.

FIG. 16 is an explanatory diagram illustrating an example of content stored in the activation-waiting information management table 1600. As illustrated in FIG. 16, the activation-waiting information management table 1600 has a field for task. In the activation-waiting information management table 1600, activation-waiting information is stored as a record by setting information in each field.

In the task field, identification information for identifying a task that is set to an activation-waiting state and has not yet been executed is set.

(Hardware Configuration Example of Node Device 201)

Next, a hardware configuration example of the node device 201 will be described with reference to FIG. 17.

Figure 17:
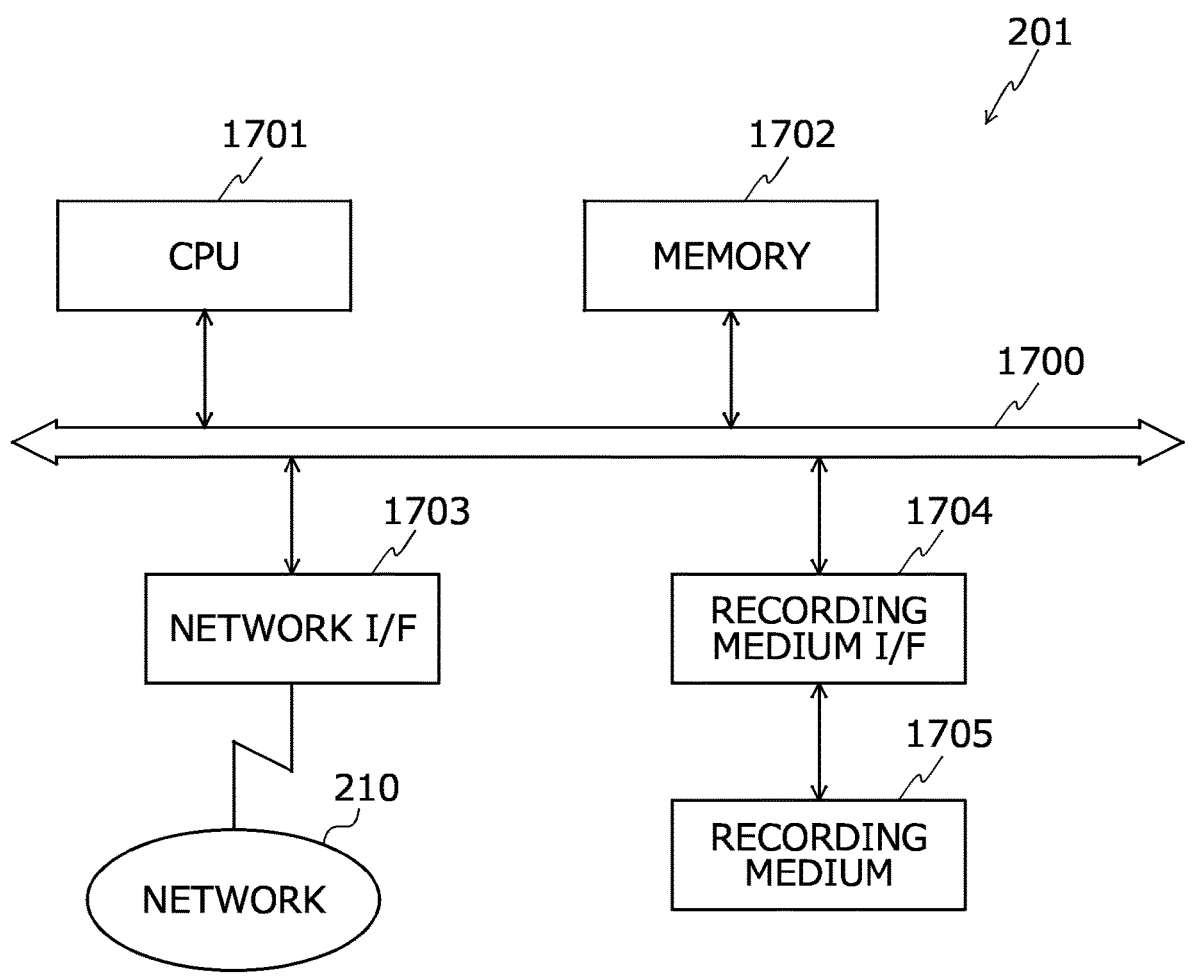
FIG. 17 is a block diagram illustrating a hardware configuration example of a node device 201.

FIG. 17 is a block diagram illustrating a hardware configuration example of the node device 201. In FIG. 17, the node device 201 includes a CPU 1701, a memory 1702, a network I/F 1703, a recording medium I/F 1704, and a recording medium 1705. Furthermore, each of the components is connected to one another via a bus 1700.

Here, the CPU 1701 performs overall control of the node device 201. The memory 1702 includes, for example, a ROM, a RAM, a flash ROM, and the like. For example, the flash ROM or the ROM stores various programs, and the RAM is used as a work area for the CPU 1701. The programs stored in the memory 1702 are loaded into the CPU 1701 to cause the CPU 1701 to execute coded processing.

The network I/F 1703 is connected to the network 210 through a communication line, and is connected to another computer through the network 210. Then, the network I/F 1703 manages an interface between the network 210 and an inside, and controls input and output of data to and from another computer. The network I/F 1703 is, for example, a modem, a LAN adapter, or the like.

The recording medium I/F 1704 controls read and write of data to and from the recording medium 1705 under the control of the CPU 1701. The recording medium I/F 1704 is, for example, a disk drive, an SSD, a USB port, or the like. The recording medium 1705 is a nonvolatile memory that stores data written under the control of the recording medium I/F 1704. The recording medium 1705 is, for example, a disk, a semiconductor memory, a USB memory, or the like. The recording medium 1705 may be attachable to and detachable from the node device 201.

The node device 201 may include, for example, a keyboard, a mouse, a display, a printer, a scanner, a microphone, a speaker, and the like in addition to the above-described components. Furthermore, the node device 201 may include, for example, a plurality of the recording media I/F 1704 and the recording media 1705. Furthermore, the node device 201 needs not include, for example, the recording medium I/F 1704 and the recording medium 1705.

(Functional Configuration Example of Information Processing Device 100)

Next, a functional configuration example of the information processing device 100 will be described with reference to FIG. 18.

Figure 18:
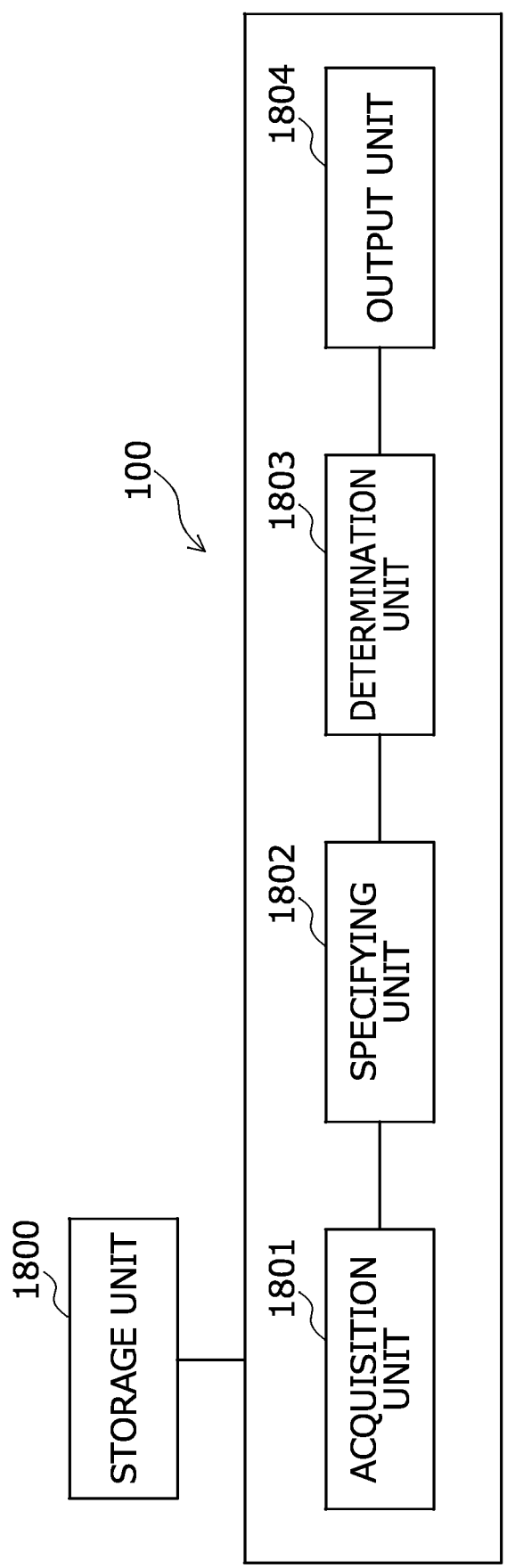
FIG. 18 is a block diagram illustrating a functional configuration example of the information processing device 100.

FIG. 18 is a block diagram illustrating a functional configuration example of the information processing device 100. The information processing device 100 includes a storage unit 1800, an acquisition unit 1801, a specifying unit 1802, a determination unit 1803, and an output unit 1804.

The storage unit 1800 is implemented by the storage area such as the memory 502 or the recording medium 505 illustrated in FIG. 5, for example. Hereinafter, the case in which the storage unit 1800 is included in the information processing device 100 will be described. However, the embodiment is not limited to this case. For example, the storage unit 1800 may be included in a device different from the information processing device 100, and content stored in the storage unit 1800 may be able to be referred to by the information processing device 100.

The acquisition unit 1801 to the output unit 1804 function as an example of a control unit. Specifically, for example, the acquisition unit 1801 to the output unit 1804 implement functions thereof by causing the CPU 501 to execute a program stored in the storage area such as the memory 502 or the recording medium 505 illustrated in FIG. 5 or by the network I/F 503. A processing result of each function unit is stored in, for example, the storage area such as the memory 502 or the recording medium 505 illustrated in FIG. 5.

The storage unit 1800 stores various types of information referred to or updated in the processing of each function unit. The storage unit 1800 stores a plurality of patterns. A pattern becomes a candidate for the arrangement order of a plurality of tasks from upstream to downstream of a stream in the case of executing the plurality of tasks using the stream processing format. The pattern is a pattern for arranging a plurality of tasks in a plurality of stages from upstream to downstream of the stream, for example.

The storage unit 1800 stores a first coefficient that represents the magnitude of the cost of transmitting data to a task. The cost is an index value indicating the magnitude of the processing load. The cost is, for example, a processing load per unit data amount applied on a node that transmits data and a processing load per unit data amount applied on a node that receives data.

The storage unit 1800 stores a second coefficient that represents the magnitude of the cost of reintroducing data to a task. The cost is an index value indicating the magnitude of the processing load. The cost is, for example, a processing load per unit data amount applied on a node that reintroduces data and a processing load per unit data amount applied on a node to which data is reintroduced.

The acquisition unit 1801 acquires various types of information to be used for the processing of each function unit. The acquisition unit 1801 stores the acquired various types of information in the storage unit 1800 or outputs the acquired various types of information to each function unit. Furthermore, the acquisition unit 1801 may output the various types of information stored in the storage unit 1800 to each function unit. The acquisition unit 1801 acquires the various types of information based on, for example, the user's operation input. The acquisition unit 1801 may receive the various types of information from a device different from the information processing device 100, for example.

The acquisition unit 1801 acquires a plurality of patterns to be candidates for the arrangement order of a plurality of tasks from upstream to downstream of a stream in the case of executing the plurality of tasks using the stream processing format. The acquisition unit 1801 acquires the plurality of patterns by, for example, generating the plurality of patterns. The acquisition unit 1801 may acquire the plurality of patterns prepared in advance, for example. The acquisition unit 1801 may acquire the plurality of patterns by, for example, extracting the plurality of patterns from a group of patterns prepared in advance. Thereby, the acquisition unit 1801 enables the specifying unit 1802 to refer to the candidates of the arrangement order of the plurality of tasks.

Specifically, the acquisition unit 1801 selects one of a plurality of tasks. For example, the acquisition unit 1801 then generates a plurality of patterns to be candidates for the arrangement order of a plurality of tasks from upstream to downstream of a stream in the case of executing the plurality of tasks using the stream processing format, the plurality of patterns each having a different position of the selected task. More specifically, the acquisition unit 1801 generates a plurality of patterns each having only the positions of the selected task different. Thereby, the acquisition unit 1801 enables the specifying unit 1802 to refer to the candidates of the arrangement order of the plurality of tasks.

Specifically, the acquisition unit 1801 selects one task from a plurality of tasks other than the task selected in any of past periods. Then, specifically, the acquisition unit 1801 generates a plurality of patterns each having a different position of the selected task. Thereby, the acquisition unit 1801 enables the specifying unit 1802 to refer to the candidates of the arrangement order of the plurality of tasks. Furthermore, the acquisition unit 1801 can generate a pattern expected to further reduce the processing load applied on the stream processing system.

Specifically, the period is, for example, a period from a time point selected a predetermined number of times before a present time point among a plurality of time points when selecting a task included in the plurality of tasks in the past to the present time point. Specifically, the acquisition unit 1801 selects one task from the plurality of tasks, the one task being other than the task selected in the period from a time point selected a predetermined number of times before a present time point among a plurality of time points when selecting a task included in the plurality of tasks in the past to the present time point. Then, specifically, the acquisition unit 1801 generates a plurality of patterns each having a different position of the selected task. Thereby, the acquisition unit 1801 can generate a pattern expected to further reduce the processing load applied on the stream processing system in consideration of the history of selecting the task in the past.

Specifically, the period is a period from a time point preset time before the present time point to the present time point. Specifically, the acquisition unit 1801 selects one task other than the task selected in the period from the time point preset time before the present time point to the present time point. Then, specifically, the acquisition unit 1801 generates a plurality of patterns each having a different position of the selected task. Thereby, the acquisition unit 1801 can generate a pattern expected to further reduce the processing load applied on the stream processing system in consideration of the history of selecting the task in the past.

Specifically, the acquisition unit 1801 selects one of the plurality of tasks in which at least either the amount of data to be transmitted to another task or the amount of data to be received from another task satisfies a condition. The condition is that the amount of data is equal to or larger than a threshold. Then, specifically, the acquisition unit 1801 generates a plurality of patterns each having a different position of the selected task. Thereby, the acquisition unit 1801 can generate a pattern expected to further reduce the processing load applied on the stream processing system in consideration of the amount of data.

The acquisition unit 1801 selects one of the plurality of tasks in which at least either the amount of data to be reintroduced to another task or the amount of data to be reintroduced from another task satisfies a condition. The condition is that the amount of data is equal to or larger than a threshold. Then, specifically, the acquisition unit 1801 generates a plurality of patterns each having a different position of the selected task. Thereby, the acquisition unit 1801 can generate a pattern expected to further reduce the processing load applied on the stream processing system in consideration of the amount of data.

The acquisition unit 1801 may accept a start trigger to start processing of any of the function units. The start trigger is, for example, a predetermined operation input by the user. The start trigger may be, for example, reception of predetermined information from another computer. The start trigger may be, for example, output of predetermined information by any of the function units. For example, the acquisition unit 1801 receives a signal periodically generated in the local device as the start trigger for starting processing with the acquisition unit 1801, the specifying unit 1802, the determination unit 1803, and the output unit 1804.

The specifying unit 1802 specifies, for each of the plurality of acquired patterns, an amount of data to be reintroduced from one task of the plurality of tasks to another task located upstream side of the stream with respect to the one task. The specifying unit 1802 measures the amount of data to exchange between tasks in the case of actually causing the stream processing platform 220 to execute the plurality of tasks, for example. The specifying unit 1802 then specifies an amount of data to be reintroduced from one task of the plurality of tasks to another task located upstream side of the stream with respect to the one task based on the measured data amount, for example. Thereby, the specifying unit 1802 can obtain information serving as an index for evaluating the magnitude of the influence on the processing load applied on the stream processing system, for each of the plurality of patterns.

The specifying unit 1802 specifies, for each of the plurality of acquired patterns, an amount of data to be transmitted from one task of the plurality of tasks to another task located downstream side of the stream with respect to the one task. The specifying unit 1802 measures the amount of data to exchange between tasks in the case of actually causing the stream processing platform 220 to execute the plurality of tasks, for example. The specifying unit 1802 then specifies an amount of data to be transmitted from one task of the plurality of tasks to another task located downstream side of the stream with respect to the one task based on the measured data amount, for example. Thereby, the specifying unit 1802 can obtain information serving as an index for evaluating the magnitude of the influence on the processing load applied on the stream processing system, for each of the plurality of patterns.

The determination unit 1803 determines the arrangement order of the plurality of tasks from upstream to downstream of the stream from among the plurality of patterns based on the specified amount of data to be reintroduced for each of the patterns. For example, the determination unit 1803 determines the pattern having a relatively small amount of data to be reintroduced among the plurality of patterns as the pattern indicating the arrangement order of the plurality of tasks from upstream to downstream of the stream. Thereby, the determination unit 1803 can determine the pattern having a relatively small processing load applied on the stream processing system and a relatively short processing time in the stream processing system.

The determination unit 1803 determines a pattern indicating the arrangement order of the plurality of tasks from upstream to downstream of the stream from among the plurality of patterns based on the specified amount of data to be reintroduced and the specified amount of data to be transmitted for each of the patterns. The determination unit 1803 calculates the cost in each pattern based on, for example, the amount of data to be reintroduced and the amount of data to be transmitted. The cost is an index value indicating the magnitude of the processing load. The determination unit 1803 then determines, for example, the pattern having the smallest cost among the plurality of patterns as the pattern indicating the arrangement order of the plurality of tasks from upstream to downstream of the stream. Thereby, the determination unit 1803 can determine the pattern having a relatively small processing load applied on the stream processing system and a relatively short processing time in the stream processing system.

The determination unit 1803 further determines the pattern indicating the arrangement order of the plurality of tasks from upstream to downstream of the stream from among the plurality of patterns based on the first coefficient representing the magnitude of the cost in transmitting data to a task. The determination unit 1803 calculates the cost in each pattern based on, for example, a result obtained by multiplying amount of data to be transmitted with the first coefficient. The determination unit 1803 then determines, for example, the pattern having the smallest cost among the plurality of patterns as the pattern indicating the arrangement order of the plurality of tasks from upstream to downstream of the stream. Thereby, the determination unit 1803 can determine the pattern having a relatively small processing load applied on the stream processing system and a relatively short processing time in the stream processing system.

The determination unit 1803 further determines the pattern indicating the arrangement order of the plurality of tasks from upstream to downstream of the stream from among the plurality of patterns based on the second coefficient representing the magnitude of the cost in reintroducing data to a task. The determination unit 1803 calculates the cost in each pattern based on, for example, a result obtained by multiplying amount of data to be reintroduced with the second coefficient. The determination unit 1803 then determines, for example, the pattern having the smallest cost among the plurality of patterns as the pattern indicating the arrangement order of the plurality of tasks from upstream to downstream of the stream. Thereby, the determination unit 1803 can determine the pattern having a relatively small processing load applied on the stream processing system and a relatively short processing time in the stream processing system.

The determination unit 1803 determines whether the amount of data to be reintroduced from at least one task of the plurality of tasks into another task satisfies a condition. The condition indicates that the amount of data is equal to or larger than a threshold. In the case of determining that the condition is satisfied, the determination unit 1803 determines the arrangement order of the plurality of tasks from upstream to downstream of the stream from among the plurality of patterns based on the specified amount of data to be reintroduced for each of the patterns. Thereby, in the case where the determination unit 1803 determines that the processing load applied on the stream processing system is relatively small, the determination unit 1803 does not determine a pattern and can reduce the processing load.

The output unit 1804 outputs a processing result of at least one of the function units. An output format is, for example, display on a display, print output to a printer, transmission to an external device by the network I/F 503, or storage to the storage area such as the memory 502 or the recording medium 505. Thus, the output unit 1804 makes it possible to notify the user of the processing result of at least one of the function units and can improve convenience of the information processing device 100.

The output unit 1804 outputs the determined pattern. The output unit 1804 outputs, for example, the determined pattern to be able to be referred to by another computer. Thereby, the output unit 1804 enables the another computer to reduce the processing load applied on the stream processing system and the processing time in the stream processing system.

The output unit 1804 causes the stream processing platform 220 to execute the plurality of tasks, using the stream processing format, in the state of arranging the plurality of tasks from upstream to downstream of the stream according to the determined pattern. The output unit 1804 causes the stream processing platform 220 to execute the plurality of tasks by transmitting an instruction of movement of a task, an instruction of execution of the task, and the like to the stream processing platform 220, for example. Thereby, the output unit 1804 can cause the stream processing platform 220 to execute the plurality of tasks while suppressing the increase in the processing load applied on the stream processing system and the processing time in the stream processing system.

(Specific Functional Configuration Example of Information Processing System 200)

Next, a specific functional configuration example of the information processing system 200 will be described with reference to FIG. 19.

Figure 19:
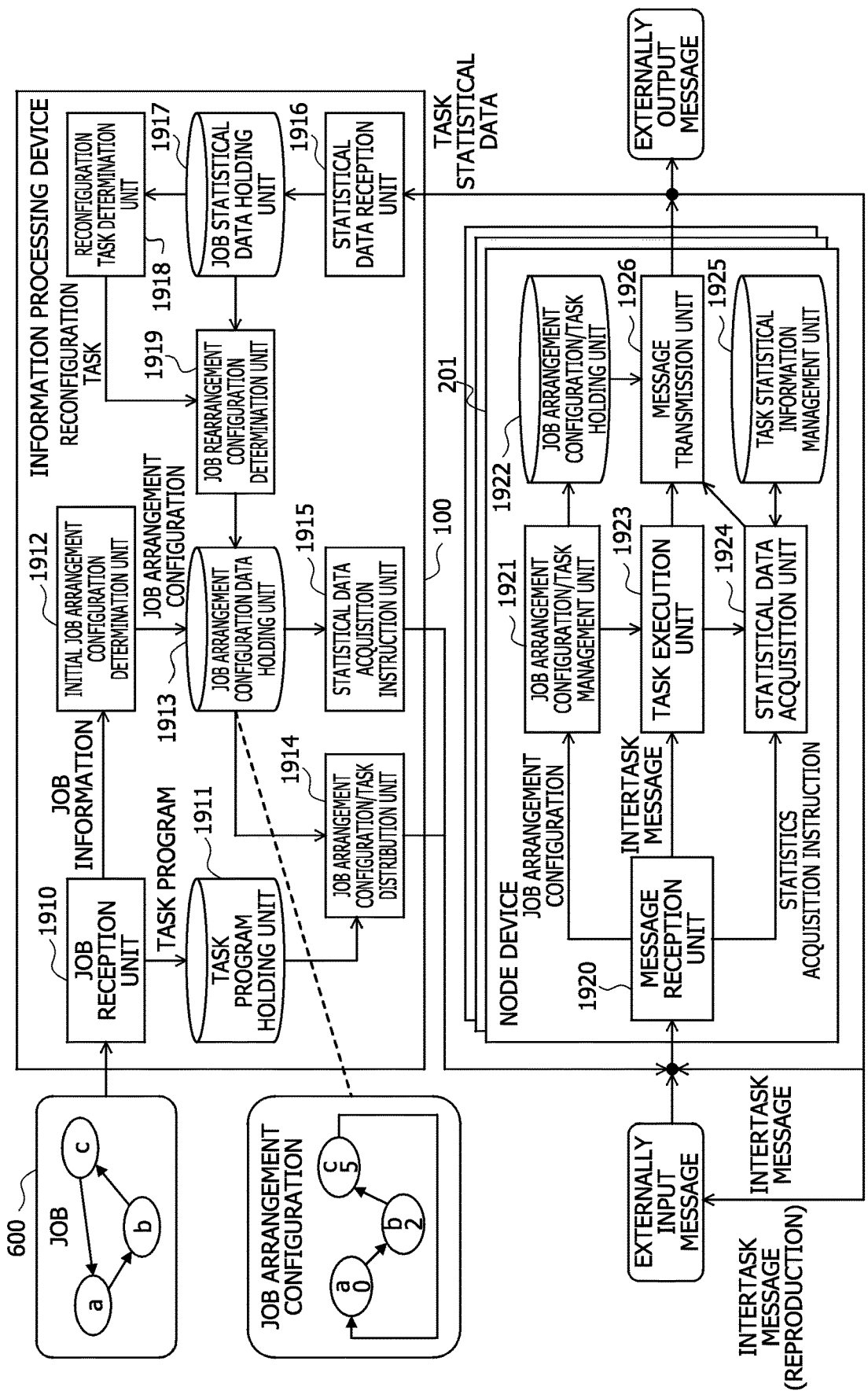
FIG. 19 is a block diagram illustrating a specific functional configuration example of the information processing system 200.

FIG. 19 is a block diagram illustrating a specific functional configuration example of the information processing system 200. In FIG. 19, the information processing device 100 includes a job reception unit 1910, a task program holding unit 1911, an initial job arrangement configuration determination unit 1912, and a job arrangement configuration data holding unit 1913. The information processing device 100 further includes a job arrangement configuration/task distribution unit 1914 and a statistical data acquisition instruction unit 1915.

The information processing device 100 further includes a statistical data reception unit 1916, a job statistical data holding unit 1917, a reconfiguration task determination unit 1918, and a job rearrangement configuration determination unit 1919. Specifically, the acquisition unit 1801 to the output unit 1804 illustrated in FIG. 18 are implemented by, for example, the job reception unit 1910 to the job rearrangement configuration determination unit 1919.

In FIG. 19, the node device 201 includes a message reception unit 1920, a job arrangement configuration/task management unit 1921, a job arrangement configuration/task holding unit 1922, and a task execution unit 1923. The node device 201 further includes a statistical data acquisition unit 1924, a task statistical information management unit 1925, and a message transmission unit 1926.

The job reception unit 1910 receives the job information 600 indicating a job including a plurality of tasks. The job reception unit 1910 transmits the task program of each task that executes the job to the task program holding unit 1911 based on the received job information 600. The job reception unit 1910 transmits the received job information 600 to the initial job arrangement configuration determination unit 1912.

The task program holding unit 1911 stores the received task program in the task program management table 800. The initial job arrangement configuration determination unit 1912 determines the stage on which each task that executes the job is arranged, and transmits the job arrangement configuration information indicating a result of arranging each task that executes the job on the stage to the job arrangement configuration data holding unit 1913. The job arrangement configuration data holding unit 1913 stores the received job arrangement configuration information in the job arrangement configuration information management table 700.

The job arrangement configuration/task distribution unit 1914 transmits an initial arrangement configuration message including the task program to the node device 201 and distributes the task to the node device 201 based on the task program holding unit 1911 and the job arrangement configuration data holding unit 1913. The statistical data acquisition instruction unit 1915 transmits the statistics acquisition instruction message 1000 to the node device 201.

The message reception unit 1920 receives various messages from the information processing device 100 or another node device 201. The various messages are, for example, the initial arrangement configuration message, the task moving instruction message 1300, a task rearrangement message, the task activation instruction message 1400, the inter-task message 900, the statistics acquisition instruction message 1000, or the like. The inter-task message 900 is a message transmitted along the stream or a message reintroduced against the stream.

The message reception unit 1920 sends an initial arrangement configuration message, a task moving instruction message 1300, a task activation instruction message 1400, or a task rearrangement message to the job arrangement configuration/task management unit 1921. The message reception unit 1920 transmits the inter-task message 900 to the task execution unit 1923. The message reception unit 1920 transmits the statistics acquisition instruction message 1000 to the statistical data acquisition unit 1924.

The job arrangement configuration/task management unit 1921 transmits the job arrangement configuration information to the job arrangement configuration/task holding unit 1922 based on the initial arrangement configuration message, the task moving instruction message 1300, or the task rearrangement message. The job arrangement configuration information indicates the result of arranging a task on a stage. The job arrangement configuration/task management unit 1921 distributes a task to the task execution unit 1923 based on the initial arrangement configuration message, the task moving instruction message 1300, or the task rearrangement message. The job arrangement configuration/task management unit 1921 cancels the activation-waiting state of the task specified in the task activation instruction message 1400 included in the task execution unit 1923 based on the task activation instruction message 1400.

The task execution unit 1923 has a task. The task execution unit 1923 executes the task. In the case where the activation-waiting state of the task is set, the task execution unit 1923 waits without executing the task. In the case where the activation-waiting state of the task is canceled, the task execution unit 1923 executes the task for which the activation-waiting state has been canceled. The task execution unit 1923 processes the inter-task message 900 by executing the task, and transmits the processed result to the message transmission unit 1926. The task execution unit 1923 transmits the processed result to the statistical data acquisition unit 1924.

The statistical data acquisition unit 1924 transmits information for updating the task statistical information to the task statistical information management unit 1925 based on the processed result. The task statistical information management unit 1925 manages the task statistical information. The task statistical information management unit 1925 updates the managed task statistical information based on the information for updating the task statistical information. When receiving the statistics acquisition instruction message 1000, the statistical data acquisition unit 1924 acquires the task statistical information from the task statistical information management unit 1925 and transmits the task statistical information to the message transmission unit 1926.

The message transmission unit 1926 transmits the inter-task message 900 including the processed result to another node device 201. The message transmission unit 1926 may output the processed result as an external output message. The message transmission unit 1926 transmits the task statistical information to the statistical data reception unit 1916. The message transmission unit 1926 transmits the task moving instruction message 1300 to another node device 201 based on the job arrangement configuration/task management unit 1921.

The statistical data reception unit 1916 receives the task statistical information and transmits the task statistical information to the job statistical data holding unit 1917. The job statistical data holding unit 1917 aggregates the task statistical information and stores the task statistical information in the task statistical information management table 1100. The reconfiguration task determination unit 1918 determines a reconfiguration task for which the stage as the arrangement destination is changed from among the plurality of task based on the job statistical data holding unit 1917, and transmits the reconfiguration task to the job rearrangement configuration determination unit 1919. The job rearrangement configuration determination unit 1919 transmits the job arrangement configuration information indicating a result of arranging each task on a stage so as to change the stage on which the reconfiguration task is arranged to the job arrangement configuration data holding unit 1913.

The job arrangement configuration/task distribution unit 1914 transmits the task rearrangement message including the task program to the node device 201 and redistributes the task to the node device 201 based on the task program holding unit 1911 and the job arrangement configuration data holding unit 1913. Thereby, the information processing system 200 can reduce the processing load applied on the stream processing system and the processing time in the stream processing system.

(Example of Simplified Operation of Information Processing Device 100)

Next, an example of a simplified operation of the information processing device 100 will be described with reference to FIG. 20.

Figure 20:
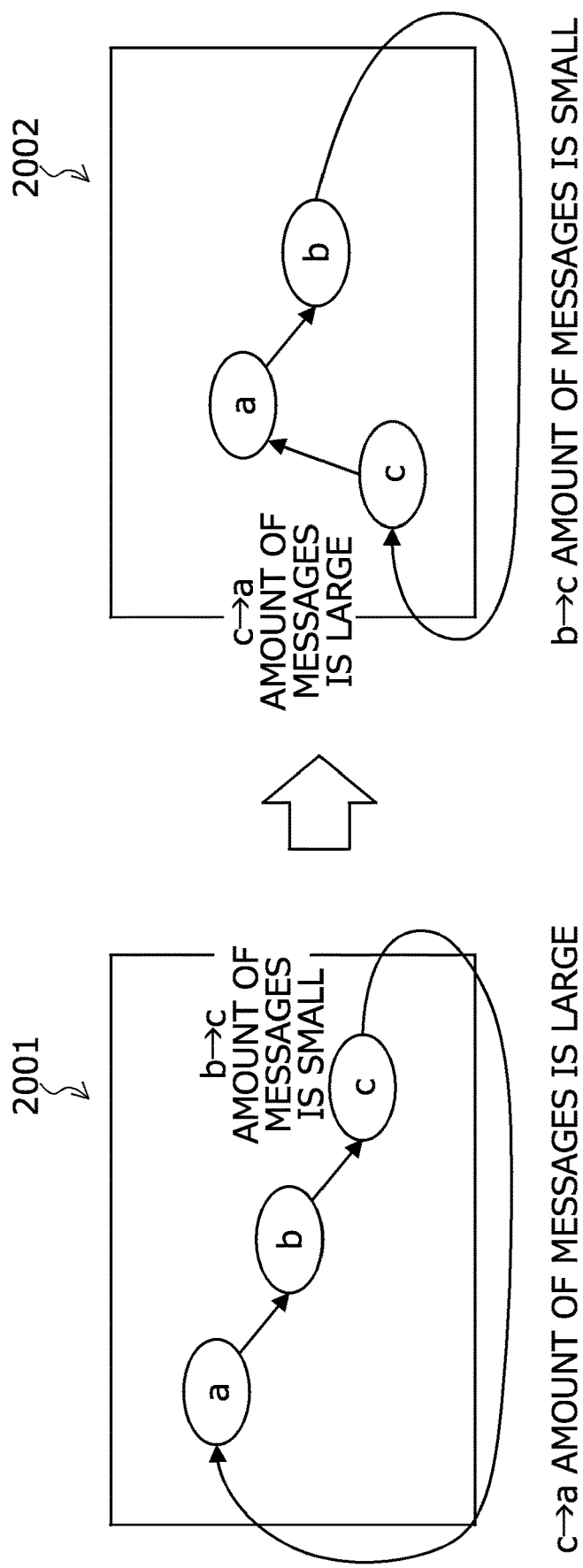
FIG. 20 is an explanatory diagram illustrating an example of a simplified operation of the information processing device 100.

FIG. 20 is an explanatory diagram illustrating an example of a simplified operation of the information processing device 100. In the example of FIG. 20, it is assumed that the arrangement configuration for causing the stream processing platform 220 to execute a plurality of tasks is the arrangement configuration illustrated by reference numeral 2001. In the arrangement configuration illustrated by reference numeral 2001, the amount of data to be transmitted from the task b to the task c is relatively small, and the amount of data to be reintroduced from the task c to the task a is relatively large. Furthermore, in the example of FIG. 20, the arrangement configuration illustrated by reference numeral 2002 is conceivable as a candidate for the arrangement configuration for causing the stream processing platform 220 to execute a plurality of tasks. In the arrangement configuration illustrated by reference numeral 2002, the amount of data to be reintroduced from the task b to the task c is relatively small, and the amount of data to be transmitted from the task c to the task a is relatively large.

In this case, the information processing device 100 determines that the arrangement configuration illustrated by reference numeral 2002 has a smaller amount of data to be reintroduced and a smaller processing load on the stream processing system than the arrangement configuration illustrated by reference numeral 2001. Therefore, the information processing device 100 changes the arrangement configuration for causing the stream processing platform 220 to execute a plurality of tasks from the arrangement configuration illustrated by reference numeral 2001 to the arrangement configuration illustrated by reference numeral 2002. Thereby, the information processing device 100 can reduce overhead in the entire stream processing system and can reduce the processing load applied on the stream processing system and the processing time in the stream processing system.

(Example of Operation of Information Processing Device 100)

Next, an example of the operation of the information processing device 100 will be described with reference to FIGS. 21 to 24.

Figure 21:
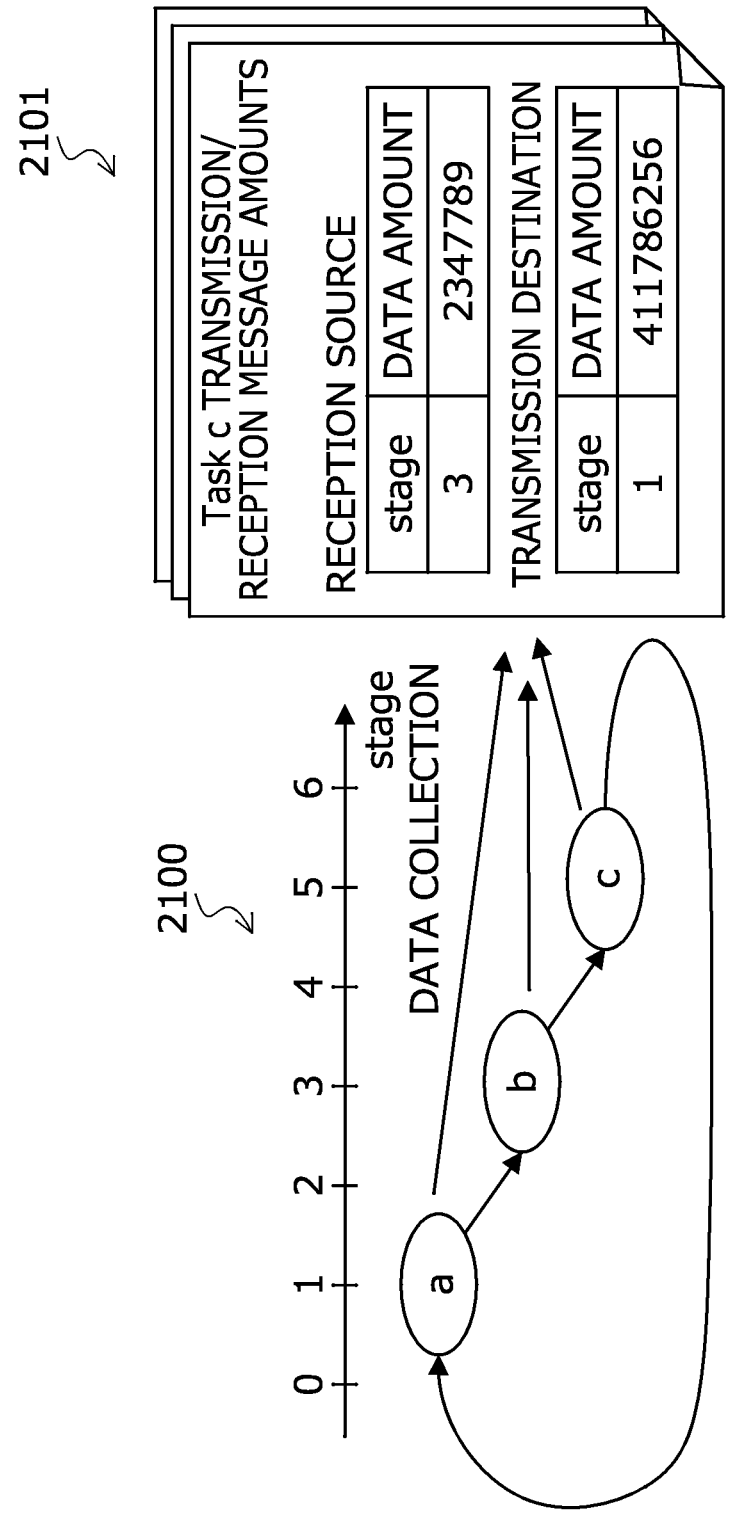
FIG. 21 is an explanatory diagram (No. 1) illustrating an example of the operation of the information processing device 100.

FIGS. 21 to 24 are explanatory diagrams illustrating an example of the operation of the information processing device 100. In FIG. 21, the information processing device 100 determines an initial arrangement configuration for causing the stream processing platform 220 to execute a plurality of tasks. The information processing device 100 determines, as the initial arrangement configuration, an arrangement configuration in which the task a, the task b, and the task c are randomly arranged on the stages, for example. In the example of FIG. 21, the information processing device 100 determines the arrangement configuration illustrated by reference numeral 2100 as the initial arrangement configuration.

The information processing device 100 distributes and executes the plurality of tasks to a plurality of nodes forming the stream processing platform 220 according to the arrangement configuration indicated by reference numeral 2100 determined as the initial arrangement configuration. In the example of FIG. 21, the information processing device 100 distributes and executes the task a, the task b, and the task c to a plurality of the node devices 201 forming the stream processing platform 220 according to the arrangement configuration illustrated by reference numeral 2100 determined as the initial arrangement configuration.

The information processing device 100 periodically collects task statistical information 2101 from the node devices 201 to which the task a, the task b, and the task c are distributed. The task statistical information 2101 indicates the amount of data transmitted by the task executed in the node device 201 and the amount of data received by the task executed in the node device 201. The information processing device 100 stores the collected task statistical information 2101 in the task statistical information management table 1100. Next, description of FIG. 22 will be given.

Figure 22:
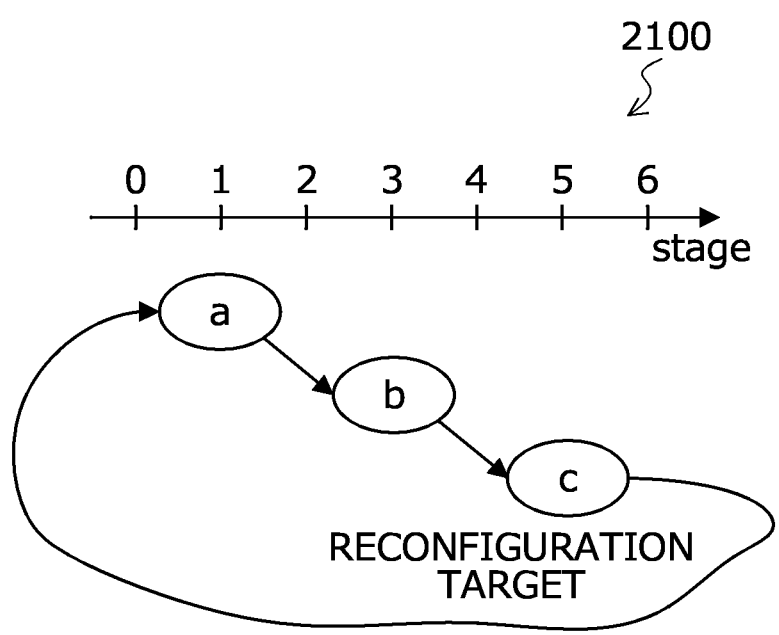
FIG. 22 is an explanatory diagram (No. 2) illustrating an example of the operation of the information processing device 100.

In FIG. 22, the information processing device 100 selects the reconfiguration task for changing the stage to be arranged among the task a, the task b, and the task c based on the task statistical information management table 1100. The information processing device 100 selects the task having the largest amount of data to be reintroduced to another task among the task a, the task b, and the task c as the reconfiguration task based on the task statistical information management table 1100, for example. In the example of FIG. 22, the information processing device 100 selects the task c as the reconfiguration task. Thereby, the information processing device 100 changes the stage for arranging the reconfiguration task and enables reduction in the processing load applied on the stream processing system.

At this time, the information processing device 100 may set a task other than the task having been selected as the reconfiguration task candidate by the time before a predetermined number of times among the plurality of tasks as the reconfiguration task. Furthermore, the information processing device 100 may set a task having the amount of messages to be transmitted or received being a threshold or larger as the reconfiguration task candidate. Then, the information processing device 100 selects the reconfiguration task from the reconfiguration task candidates. Thereby, the information processing device 100 can select the task having a relatively large influence on the processing load applied on the stream processing system as the reconfiguration task. Therefore, the information processing device 100 can easily reduce the processing load applied on the stream processing system.

Furthermore, in the case where there is no task having the amount of data to be reintroduced being the threshold or larger, the information processing device 100 needs not select the reconfiguration task. Thereby, the information processing device 100 can reduce the processing amount in the case where reduction in the processing load applied on the stream processing system is considered to be difficult. Furthermore, the information processing device 100 can suppress the increase in the processing load applied on the stream processing system by not allowing task movement among the node devices 201. Next, description of FIG. 23 will be given.

In FIG. 23, the information processing device 100 calculates, for each stage, the reception cost, the transmission cost, and the total cost in the case of arranging the reconfiguration task on the stage, and stores the calculated costs in the cost information management table 1200. The information processing device 100 selects the stage with the smallest total cost as a rearrangement destination stage. In the example of FIG. 23, the information processing device 100 selects stage 0 as the rearrangement destination stage. Thereby, the information processing device 100 can select the rearrangement destination stage expected to reduce the processing load applied on the stream processing system most by arranging the reconfiguration task. Next, description of FIG. 24 will be given.

Figure 24:
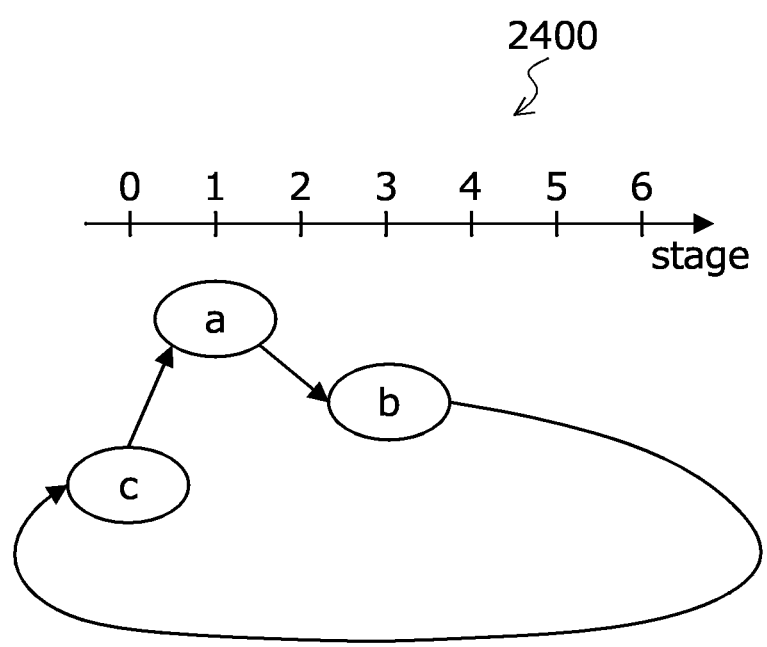
FIG. 24 is an explanatory diagram (No. 4) illustrating an example of the operation of the information processing device 100.

In FIG. 24, the information processing device 100 determines a rearrangement configuration for causing the stream processing platform 220 to execute a plurality of tasks such that the reconfiguration task is arranged on the stage with the smallest total cost. In the example of FIG. 24, the information processing device 100 determines the arrangement configuration illustrated by reference numeral 2400 as the rearrangement configuration. Thereby, the information processing device 100 can reduce the processing load applied on the stream processing system and the processing time in the stream processing system by changing the arrangement of the reconfiguration task.

(Specific Example of Operation of Information Processing Device 100)

Next, a specific example of the operation of the information processing device 100 will be described with reference to FIGS. 25 to 29.

Figure 25:
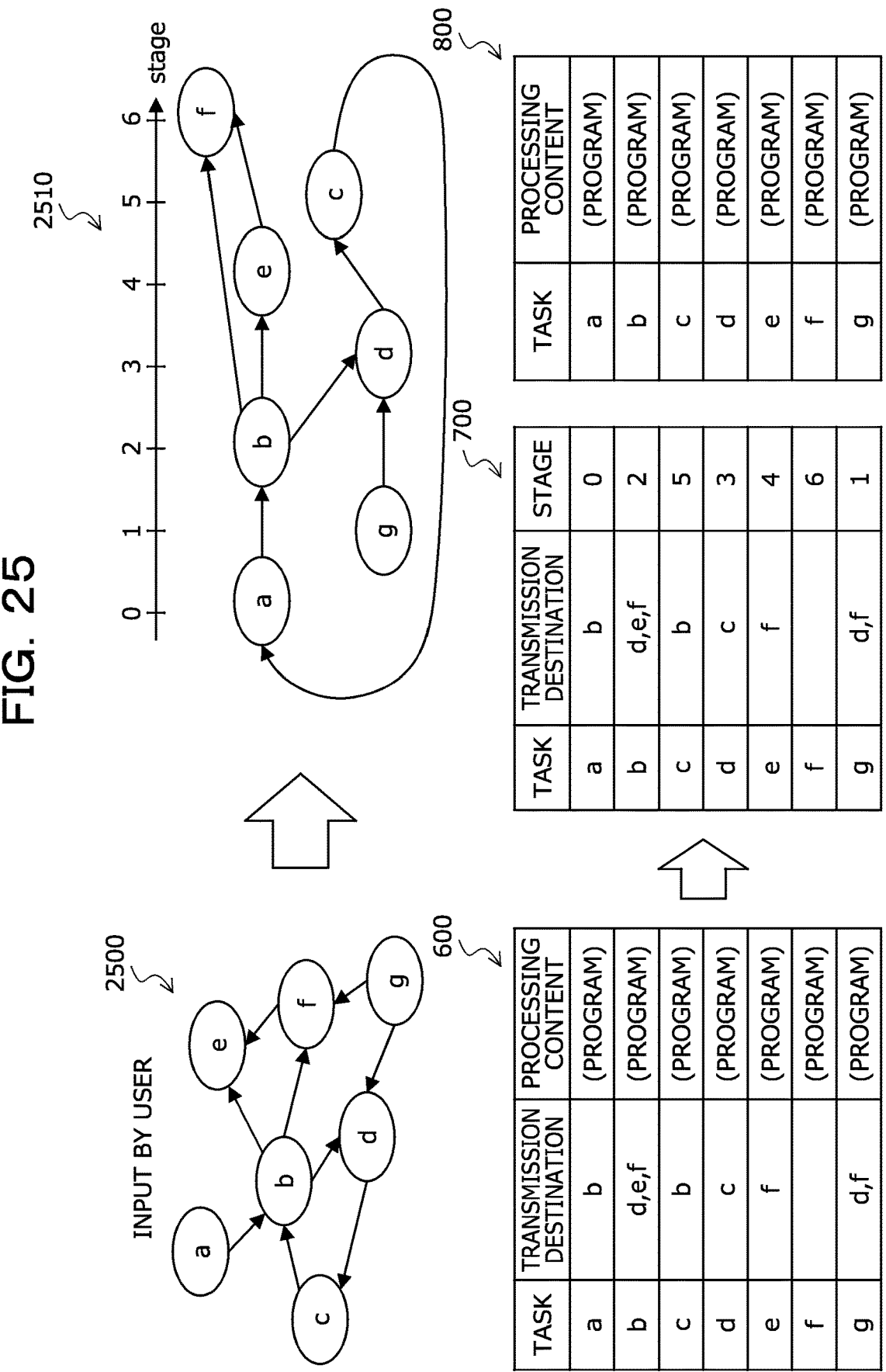
FIG. 25 is an explanatory diagram (No. 1) illustrating a specific example of the operation of the information processing device 100.

FIGS. 25 to 29 are explanatory diagrams illustrating a specific example of operation of the information processing device 100. In FIG. 25, the information processing device 100 receives the job information 600 illustrating graph 2500 that defines the transmission/reception relationship of the tasks a to g. The direction of a directed edge in the graph 2500 indicates a direction of the data transmission. The job information 600 is input to the information processing device 100 by the user, for example.

The information processing device 100 determines the stages for arranging the tasks a to g based on search processing to be described later in FIG. 31. The information processing device 100 determines the stages for arranging the tasks a to g, as illustrated by reference numeral 2510, for example. The information processing device 100 generates the job arrangement configuration information indicating the determined stages for arranging the tasks a to g, and stores the job arrangement configuration information in the job arrangement configuration information management table 700. The information processing device 100 generates the task program information that summarizes task programs for executing the tasks a to g, and stores the task program information in the task program management table 800.

Next, the description moves onto FIG. 26, and an example in which the information processing device 100 determines the stages for arranging each of the plurality of tasks based on the search processing to be described later in FIG. 31 will be described. Specifically, the information processing device 100 determines the stages for arranging each of the plurality of tasks using topological sort.

Figure 26:
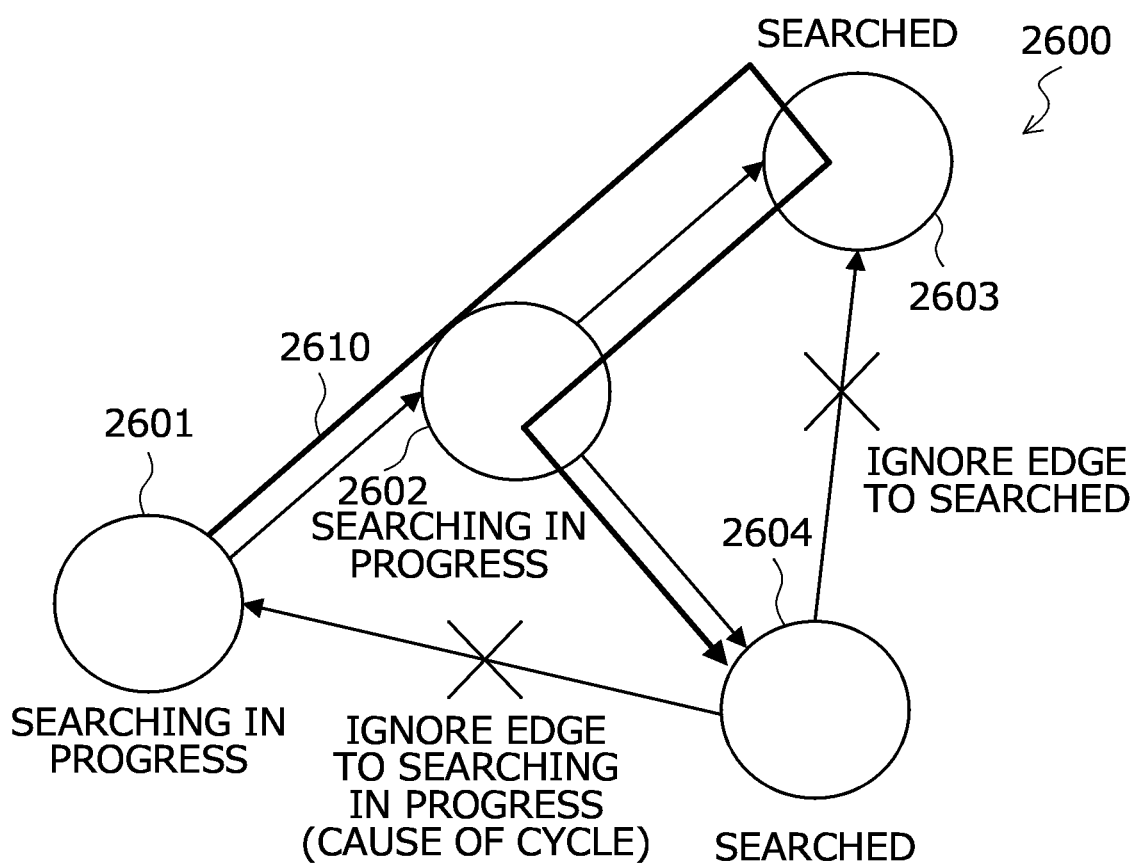
FIG. 26 is an explanatory diagram (No. 2) illustrating a specific example of the operation of the information processing device 100.

In FIG. 26, a case of four tasks will be described for simplification of the description. In the example of FIG. 26, the transmission/reception relationship of tasks 2601 to 2604 is defined as illustrated in graph 2600. The direction of a directed edge in the graph 2600 indicates a direction of the data transmission.

(26-1) The information processing device 100 sets a search flag=unsearched in the tasks 2601 to 2604, for example. The information processing device 100 prepares a list for storing the tasks, for example.

(26-2) The information processing device 100 selects, for example, the task 2601. The information processing device 100 sets the search flag of the selected task 2601=searching in progress, for example. The information processing device 100 selects another task 2602 connected by the directed edge starting from the selected task 2601, for example.

(26-3) The information processing device 100 sets the search flag of the selected task 2602=searching in progress, for example. The information processing device 100 selects another task 2603 connected by the directed edge starting from the selected task 2602, for example.

(26-4) The information processing device 100 sets the search flag of the selected task 2603=searching in progress, for example. The information processing device 100 sets the search flag of the selected task 2603=searched because there is no other tasks connected by the directed edge starting from the selected task 2603, for example. The information processing device 100 inserts the task 2603 set to the search flag=searched in the top of the list, for example.

(26-5) The information processing device 100 returns to the processing of the task 2602 selected before the task 2603, for example. The information processing device 100 selects another task 2604 connected by the directed edge starting from the task 2602, for example. The thick arrow 2610 in the graph 2600 indicates the flow of processing until task 2604 is selected.

(26-6) The information processing device 100 sets the search flag of the selected task 2604=searching in progress, for example. Since the another tasks 2601 and 2603 connected by the directed edges starting from the selected task 2604 do not have the search flag=unsearched, the information processing device 100 ignores each of these directed edges and sets the search flag of the selected task 2604=searched, for example. The information processing device 100 inserts the task 2604 set to the search flag=searched in the top of the list, for example.

(26-7) The information processing device 100 returns to the processing of the task 2602 selected before the task 2604, for example. The information processing device 100 sets the search flag of the selected task 2602=searched because the another tasks 2603 and 2604 connected by the directed edges starting from the selected task 2602 have the search flag=searched, for example. The information processing device 100 inserts the task 2602 set to the search flag=searched in the top of the list.

(26-8) The information processing device 100 returns to the processing of the task 2601 selected before the task 2602, for example. The information processing device 100 sets the search flag of the selected task 2601=searched because the another task 2602 connected by the directed edge starting from the selected task 2601 has the search flag=searched, for example. The information processing device 100 inserts the task 2601 set to the search flag=searched in the top of the list.

(26-9) The information processing device 100 takes out tasks one by one from the top of the list and arranges the tasks in order from an upstream stage among the plurality of stages. As a result, the information processing device 100 can arrange the plurality of tasks on the plurality of stages. At this time, the information processing device 100 can arrange the plurality of tasks on the plurality of stages such that the processing load applied on the stream processing system is relatively small.

Here, the case in which the information processing device 100 arranges the tasks a to g on the stages based on the search processing to be described later in FIG. 31 has been described, but the present embodiment is not limited to the case. For example, the information processing device 100 may randomly arrange the tasks a to g on the stages in a case where the transmission/reception relationship of the tasks a to g is unknown. Next, description of FIG. 27 will be given.

Figure 27:
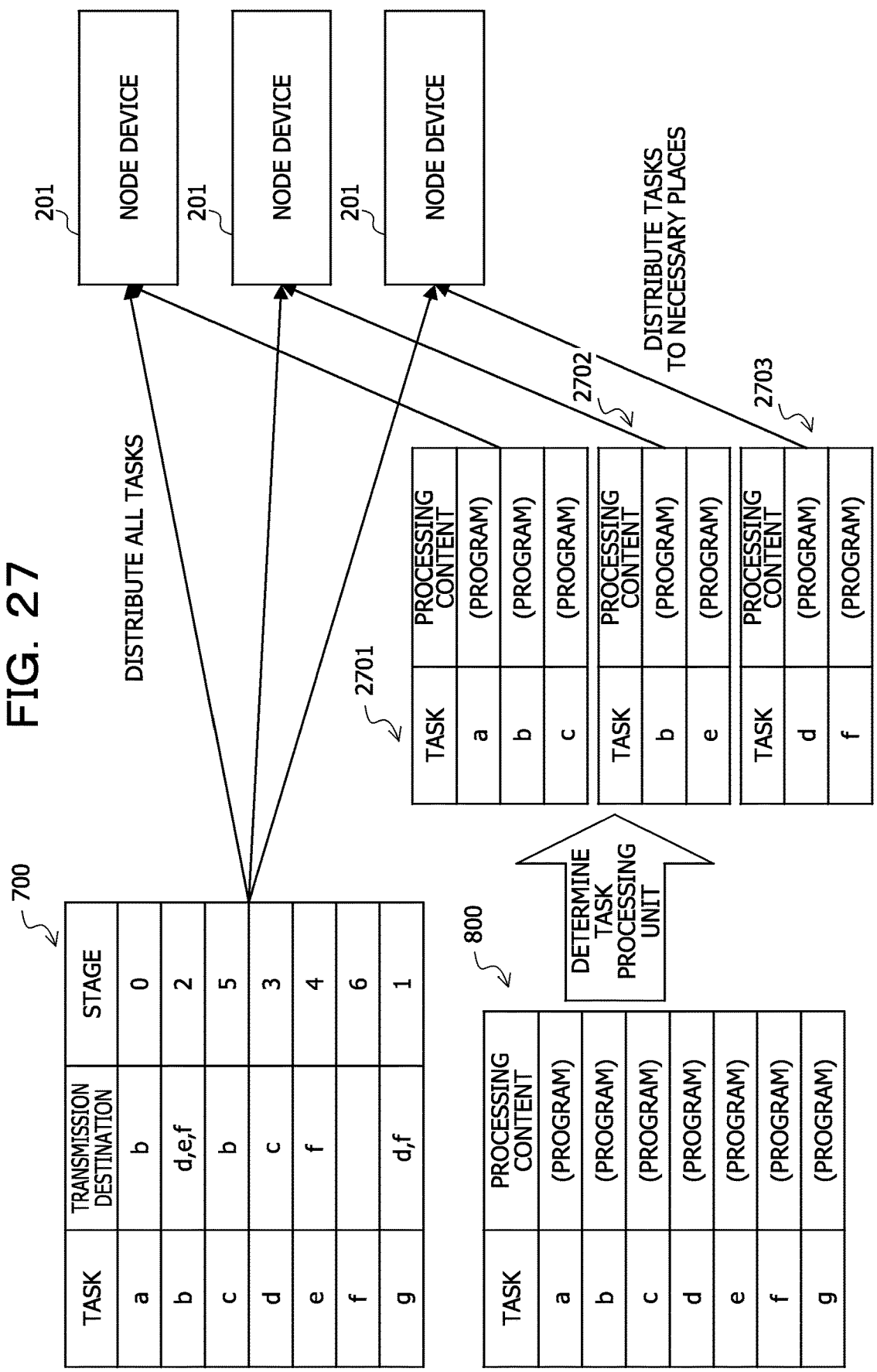
FIG. 27 is an explanatory diagram (No. 3) illustrating a specific example of the operation of the information processing device 100.

In FIG. 27, the information processing device 100 distributes the tasks a to g to the node devices 201 based on the job arrangement configuration information management table 700 and the task program management table 800. For example, the information processing device 100 divides the task program information and assigns the divided pieces of information to the respective node devices 201. For example, the information processing device 100 transmits, to each of the node devices 201, the initial arrangement configuration message including the job arrangement configuration information and the task program information assigned to the node device 201. The job arrangement configuration information indicates the stages for arranging the tasks a to g and the transmission destinations for the tasks a to g.

Specifically, the information processing device 100 assigns the tasks a to g one by one to any of the node device 201 of the plurality of node devices 201 according to the order of numbers assigned to the node devices 201. Then, the information processing device 100 specifically generates the task program information including the task program for executing the task assigned to the respective node devices 201 among the tasks a to g. Specifically, the information processing device 100 transmits, to each of the node devices 201, the initial arrangement configuration message including the task program information generated for the node device 201 and the job arrangement configuration information.

In the example of FIG. 27, the information processing device 100 transmits pieces of task program information 2701 to 2703 to each of the different node devices 201. Furthermore, specifically, the information processing device 100 may assign the tasks a to g one by one to any node device 201 of the plurality of node devices 201, using a hash function. Furthermore, specifically, the information processing device 100 may assign the tasks a to g one by one to any node device 201 of the plurality of node devices 201, using modulo operation.

The node device 201 makes the task in a state of being executable based on the job arrangement configuration information and the task program information. When receiving various messages from the information processing device 100 or another node device 201, the node device 201 executes the task and processes the various messages. The node device 201 executes the task and processes the various messages by, for example, reception processing to be described later in FIGS. 32 and 33. The node device 201 periodically transmits the task statistical information including the amount of data transmitted and received by the task to the information processing device 100. Next, description of FIG. 28 will be given.

In FIG. 28, (28-1) the information processing device 100 sets the reconfiguration task based on the accumulated task statistical information. The information processing device 100 sets the reconfiguration task by, for example, selection processing to be described later in FIG. 35 based on the accumulated task statistical information. Specifically, the information processing device 100 sets all the tasks as the reconfiguration task candidates.

Specifically, the information processing device 100 excludes a task selected as a reconfiguration task from the reconfiguration task candidates in any of the past periods among the reconfiguration task candidates. Specifically, the information processing device 100 excludes a task previously selected as the reconfiguration task from the reconfiguration task candidates among the reconfiguration task candidates. Thereby, the information processing device 100 can exclude the task that has been selected in the past and is determined to have a relatively small contribution to the reduction in the processing load applied on the stream processing system even if the task is set to the reconfiguration task again from the reconfiguration task candidates.

Specifically, the information processing device 100 excludes the task having the amount of messages to be transmitted or received being a threshold or smaller among the reconfiguration task candidates from the reconfiguration task candidates. Thereby, the information processing device 100 can exclude the task having a relatively small amount of messages to be transmitted or received and determined to have a relatively small contribution to the reduction in the processing load applied on the stream processing system from the reconfiguration task candidates.

Specifically, the information processing device 100 selects the task having the largest amount of data to be reintroduced from the reconfiguration task candidates and sets the task as the reconfiguration task. Thereby, the information processing device 100 can set the task determined to have a relatively large contribution to the reduction in the processing load applied on the stream processing system as the reconfiguration task.

At this time, specifically, the information processing device 100 needs not select the reconfiguration task in the case where there is no task having the amount of messages to be reintroduced being the threshold or larger among the plurality of tasks. Thereby, the information processing device 100 can reduce the processing amount without selecting the reconfiguration task in the case where reduction in the processing load applied on the stream processing system is difficult.

(28-2) The information processing device 100 calculates cost $C_k$ for the stream processing system in the case where the reconfiguration task is arranged in a stage k. k is the number assigned to the stage. The smaller the value of k, the more upstream the stage is. The cost $C_k$=the reception cost+the transmission cost.

The reception cost=$\Sigma_{i=0}^{k-1}$ (a reception amount $R_i$ from an upstream stage i×a transfer cost coefficient F)+$\Sigma_{i=k}^{n}$ (the reception amount $R_i$ from a downstream stage i×a reintroduced cost coefficient B). i is the number assigned to the stage. n is the maximum value of the number assigned to the stage. The transfer cost coefficient F is, for example, the magnitude of the processing load per unit data amount in data transmission. The reintroduced cost coefficient B is, for example, the magnitude of the processing load per unit data amount in data reintroduction. The transfer cost coefficient F and the reintroduced cost coefficient B are set by the user, for example. The transmission cost=$\Sigma_{i=0}^{k-1}$ (a transmission amount $S_i$ to the upstream stage i×the reintroduced cost coefficient B)+$\Sigma_{i=k}^{n}$ (the transmission amount $S_i$ to the downstream stage i×the transfer cost coefficient F).

Specifically, the information processing device 100 calculates the cost $C_k$ by the matrix equation illustrated by reference numeral 2800. Of the matrix equation illustrated by reference numeral 2800, the elements illustrated by reference numeral 2801 indicate the reception costs of the respective stages. Of the matrix equation illustrated by reference numeral 2800, the elements illustrated by reference numeral 2802 indicate the transmission costs of the respective stages.

The information processing device 100 specifies the cost $C_k$ having the smallest value among the costs $C_0$ to $C_n$, and sets the stage k corresponding to the specified cost $C_k$ as the rearrangement destination stage for arranging the reconfiguration task. Thereby, the information processing device 100 can set the rearrangement destination stage to reduce the processing load applied on the stream processing system. Next, description of FIG. 29 will be given.

Figure 29:
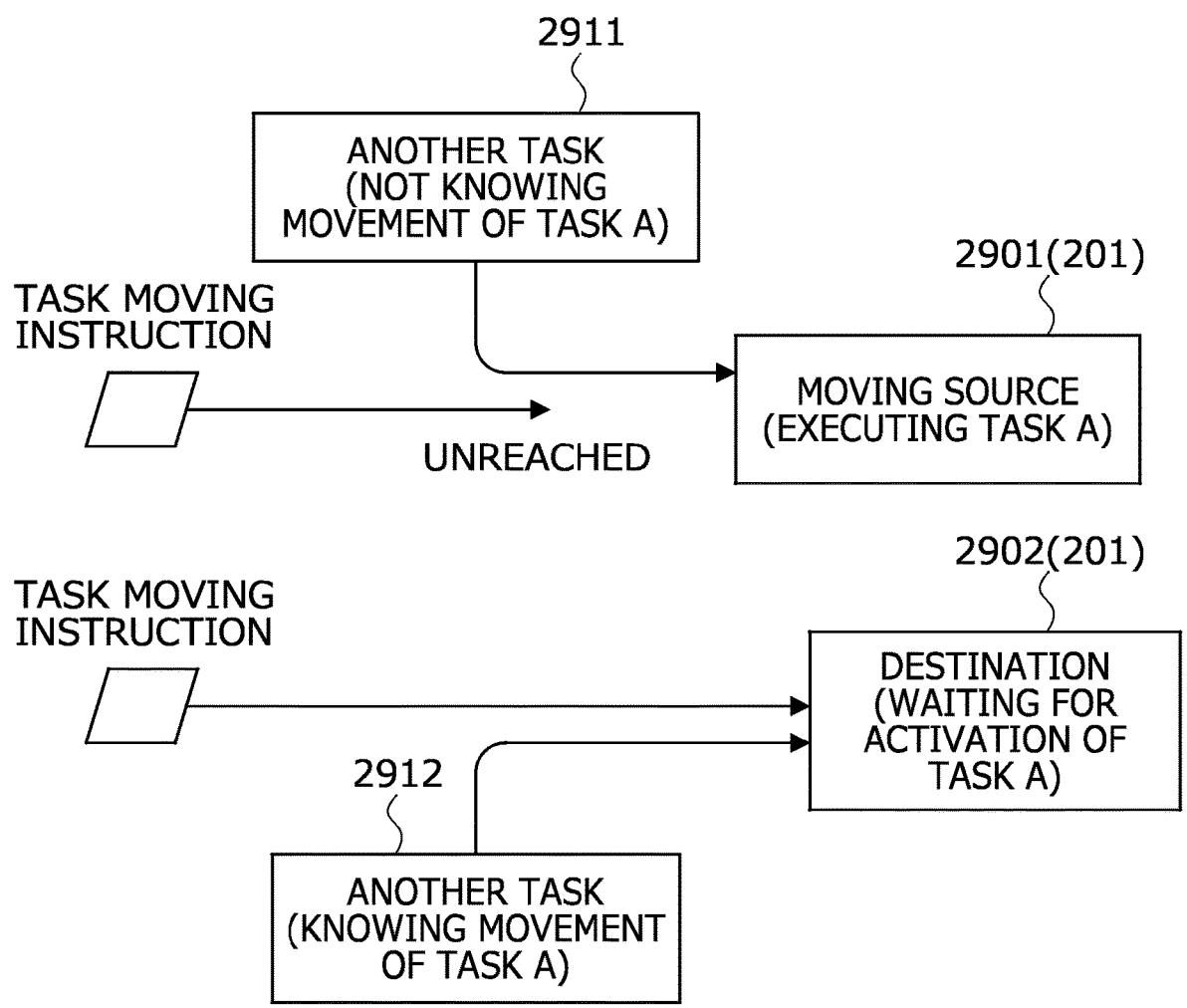
FIG. 29 is an explanatory diagram (No. 5) illustrating a specific example of the operation of the information processing device 100.

In FIG. 29, the information processing device 100 transmits the task moving instruction message 1300 to at least one of the node devices 201 based on the set reconfiguration task and the set rearrangement destination stage. In the example of FIG. 29, the reconfiguration task=the task A.

When receiving the task moving instruction message 1300, the node device 201 to be a destination 2902 sets the task A to be in the activation-waiting state. The node device 201 to be the destination 2902 accumulates various messages from another task 2912 without processing the messages while the task A is in the activation-waiting state. The node device 201 to be a moving source 2901 processes received various messages if receiving the various messages from another task 2911 before receiving the task moving instruction message 1300.

When receiving the task moving instruction message 1300, the node device 201 to be the moving source 2901 deletes the task A and transmits the task activation instruction message 1400 for the task A to the node device 201 to be the destination 2902. When receiving the task activation instruction message 1400 for the task A, the node device 201 to be the destination 2902 cancels the activation-waiting state of the task A and processes the accumulated various messages.

Thereby, the stream processing system can suppress that the node device 201 to be the moving source 2901 and the node device 201 to be the destination 2902 execute the same task at the same time. Therefore, the stream processing system can guarantee the processing order of the messages. If the activation-waiting state is not set for the task, the node device 201 to be the destination 2902 receives the task moving instruction message 1300 before the node device 201 to be the moving source 2901, and as a result, the same task will be executed at the same time.

(Arrangement Processing Procedure)

Next, an example of an arrangement processing procedure executed by the information processing device 100 will be described with reference to FIG. 30. The arrangement processing is implemented by, for example, the CPU 501, the storage area such as the memory 502 or the recording medium 505, and the network I/F 503 illustrated in FIG. 5.

Figure 30:
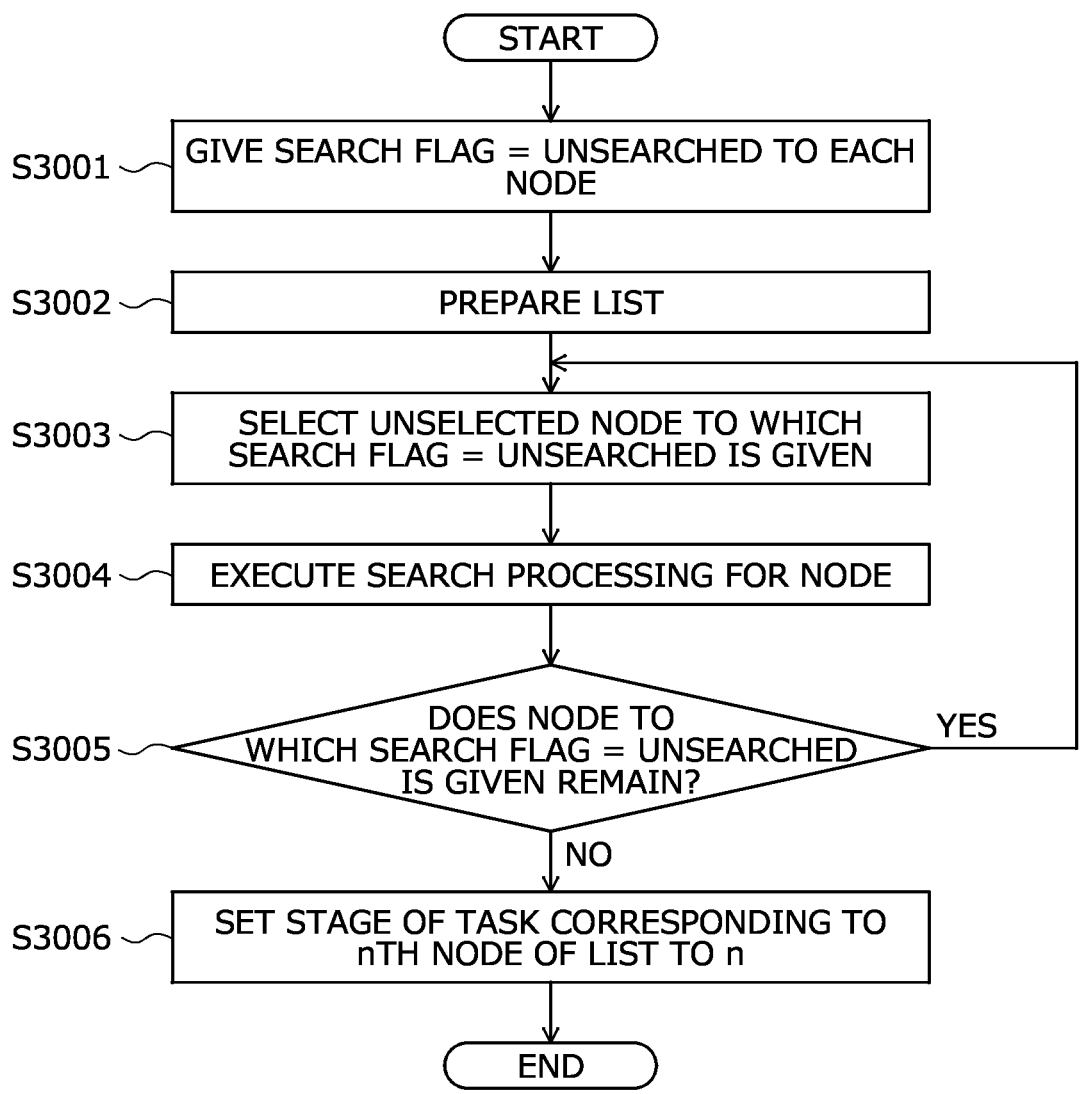
FIG. 30 is a flowchart illustrating an example of an arrangement processing procedure.

FIG. 30 is a flowchart illustrating an example of the arrangement processing procedure. In FIG. 30, the information processing device 100 gives the search flag=unsearched to each node (step S3001).

Next, the information processing device 100 prepares a list (step S3002). Then, the information processing device 100 selects a node to which the search flag=unsearched has been given and has not yet been selected from among the plurality of nodes (step S3003).

Next, the information processing device 100 executes the search processing to be described later in FIG. 31 for the selected node (step S3004). Then, the information processing device 100 determines whether a node to which the search flag=unsearched has been given remains among the plurality of nodes (step S3005).

Here, in the case where a node to which the search flag=unsearched has been given remains (step S3005: Yes), the information processing device 100 returns to the processing of step S3003. On the other hand, in the case where there is no node to which the search flag=unsearched has been given (step S3005: No), the information processing device 100 proceeds to the processing of step S3006.

In step S3006, the information processing device 100 sets the stage of the task corresponding to the nth node in the list to n (step S3006). Then, the information processing device 100 terminates the arrangement processing.

(Search Processing Procedure)

Next, an example of the search processing procedure executed by the information processing device 100 will be described with reference to FIG. 31. The search processing is implemented by, for example, the CPU 501, the storage area such as the memory 502 or the recording medium 505, and the network I/F 503 illustrated in FIG. 5.

Figure 31:
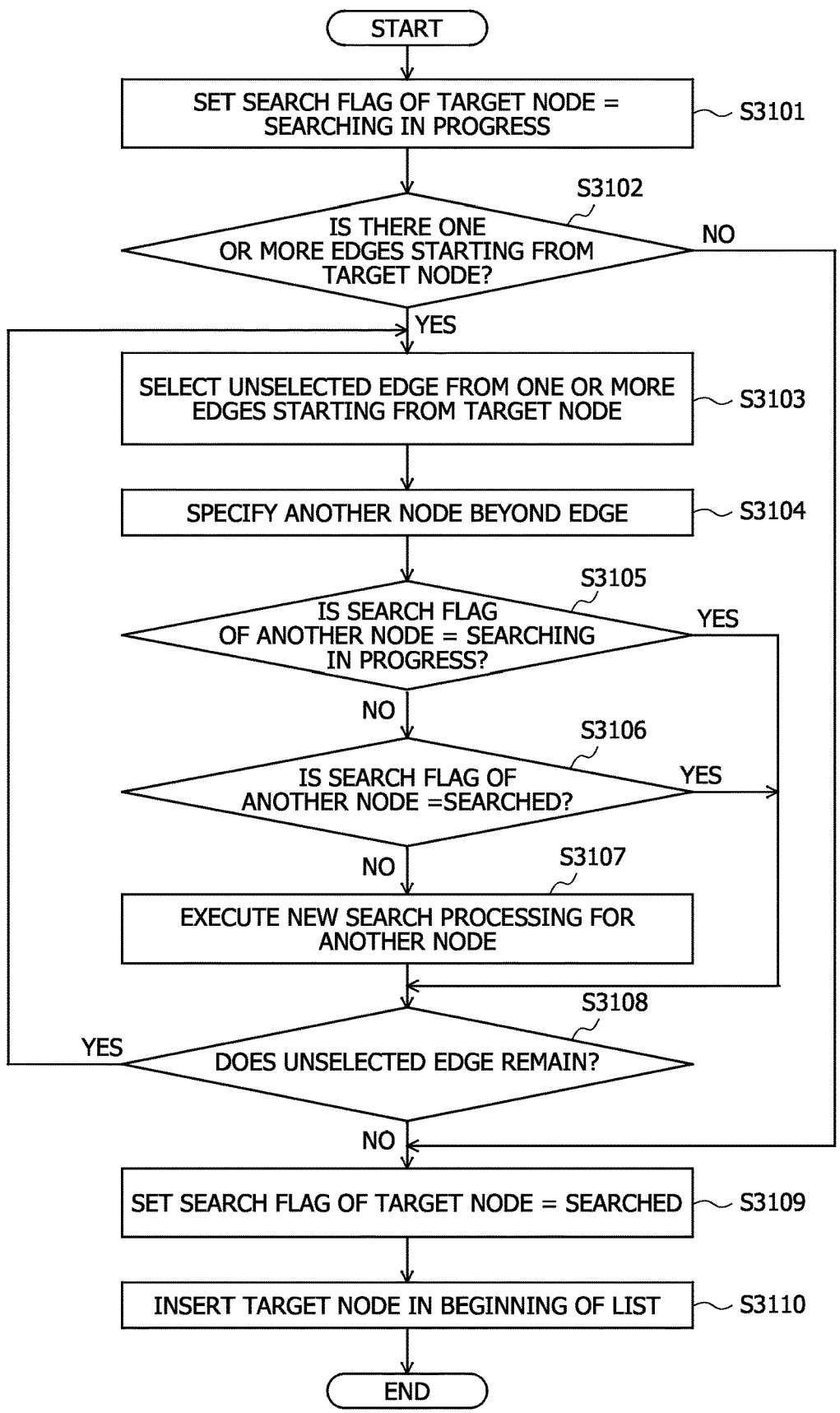
FIG. 31 is a flowchart illustrating an example of a search processing procedure.

FIG. 31 is a flowchart illustrating an example of the search processing procedure. In FIG. 31, the information processing device 100 sets the search flag of the target node=searching in progress (step S3101). Next, the information processing device 100 determines whether there is one or more edges starting from the target node (step S3102).

Here, in the case where there is one or more edges starting from the target node (step S3102: Yes), the information processing device 100 proceeds to the processing of step S3103. On the other hand, in the case where one or more edges starting from the target node are not present (step S3102: No), the information processing device 100 proceeds to the processing of step S3109.

In step S3103, the information processing device 100 selects an edge that has not yet been selected from among the one or more edges starting from the target node (step S3103). Next, the information processing device 100 specifies another node beyond the selected edge, starting from the target node (step S3104). Then, the information processing device 100 determines whether the search flag of the specified another node=searching in progress (step S3105).

Here, in the case where the search flag of another node=searching in progress (step S3105: Yes), the information processing device 100 proceeds to the processing of step S3108. On the other hand, in the case where the search flag of another node=not searching in progress (step S3105: No), the information processing device 100 proceeds to the processing of step S3106.

In step S3106, the information processing device 100 determines whether the search flag of the specified another node=searched (step S3106).

Here, in the case where the search flag of another node=searched (step S3106: Yes), the information processing device 100 proceeds to the processing of step S3108. On the other hand, in the case where the search flag of another node=not searched (step S3106: No), the information processing device 100 proceeds to the processing of step S3107.

In step S3107, since the search flag of the specified another node=unsearched, the information processing device 100 recursively executes new search processing for the specified another node (step S3107). Then, the information processing device 100 determines whether an edge that has not yet been selected remains among the one or more edges starting from the target node (step S3108).

Here, in the case where the edge that has not yet been selected remains (step S3108: Yes), the information processing device 100 returns to the processing of step S3103. On the other hand, in the case where all the edges have been selected (step S3108: No), the information processing device 100 proceeds to the processing of step S3109.

In step S3109, the information processing device 100 sets the search flag of the target node=searched (step S3109). Next, the information processing device 100 inserts the target node in the beginning of the list (step S3110). Then, the information processing device 100 terminates the search processing.

(Reception Processing Procedure)

Next, an example of the reception processing procedure executed by the node device 201 will be described with reference to FIGS. 32 and 33. The reception processing is implemented by, for example, the CPU 1701, the storage area such as the memory 1702 or the recording medium 1705, and the network I/F 1703 illustrated in FIG. 17.

Figure 32:
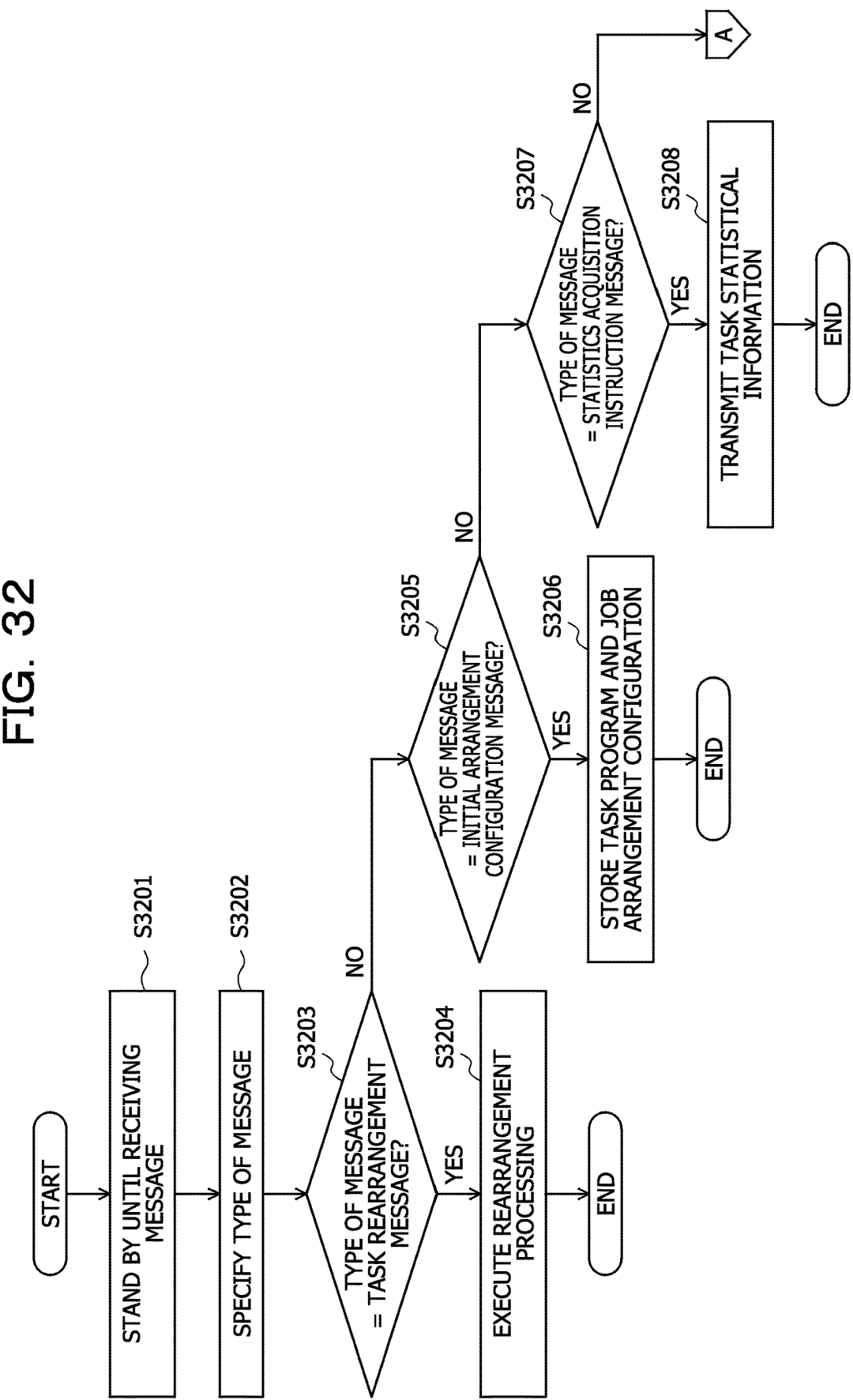
FIG. 32 is a flowchart (No. 1) illustrating an example of a reception processing procedure.
Figure 33:
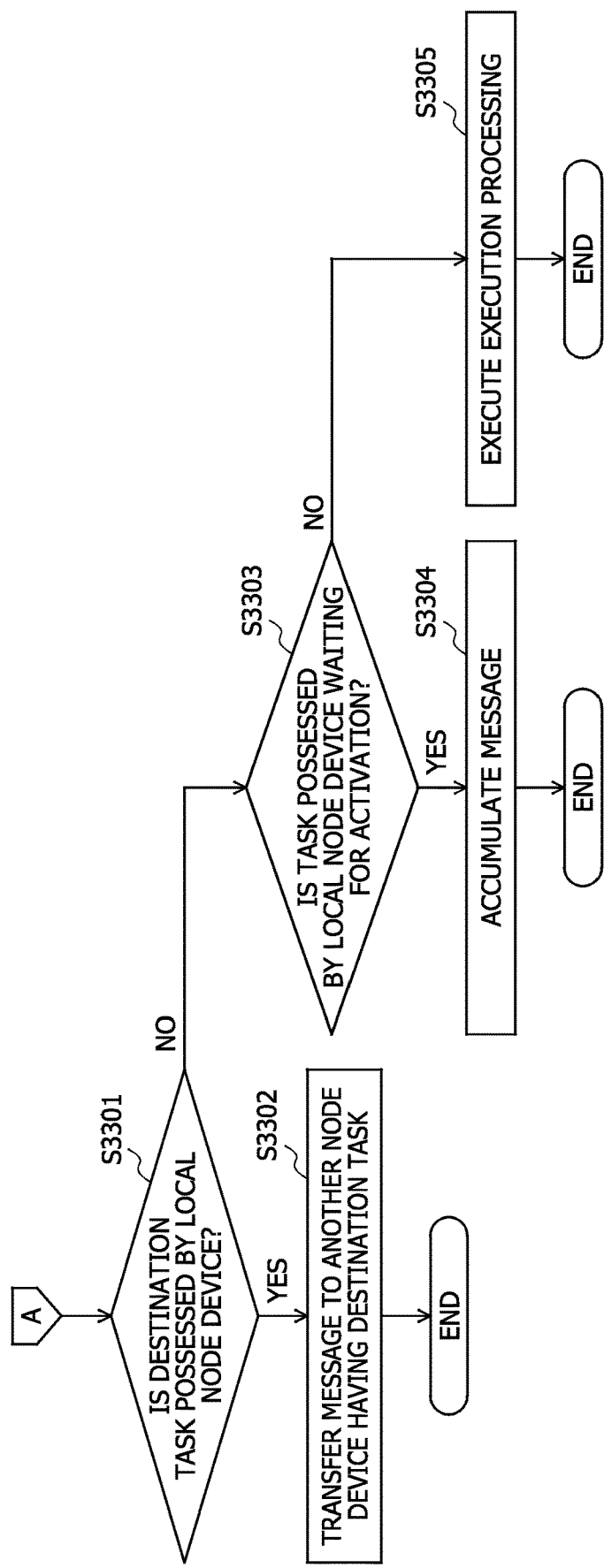
FIG. 33 is a flowchart (No. 2) illustrating an example of a reception processing procedure.

FIGS. 32 and 33 are flowcharts illustrating an example of the reception processing procedure. In FIG. 32, the node device 201 waits until receiving a message (step S3201).

Next, the node device 201 identifies the type of the received message (step S3202). Then, the node device 201 determines whether the message type=the task rearrangement message (step S3203). The task rearrangement message is a name of a superordinate concept of the task moving instruction message 1300 and the task activation instruction message 1400.

Here, in the case where the message type=the task rearrangement message (step S3203: Yes), the node device 201 proceeds to the processing of step S3204. On the other hand, in the case where the message type=not the task rearrangement message (step S3203: No), the node device 201 proceeds to the processing of step S3205.

In step S3204, the node device 201 executes the rearrangement processing to be described later in FIGS. 36 and 37 (step S3204). Then, the node device 201 terminates the reception processing.

In step S3205, the node device 201 determines whether the message type=the initial arrangement configuration message (step S3205).

Here, in the case where the message type=the initial arrangement configuration message (step S3205: Yes), the node device 201 proceeds to the processing of step S3206. On the other hand, in the case where the message type=not the initial arrangement configuration message (step S3205: No), the node device 201 proceeds to the processing of step S3207.

In step S3206, the node device 201 stores the task program and the job arrangement configuration (step S3206). Then, the node device 201 terminates the reception processing.

In step S3207, the node device 201 determines whether the message type=the statistics acquisition instruction message 1000 (step S3207).

Here, in the case where the message type=the statistics acquisition instruction message 1000 (step S3207: Yes), the node device 201 proceeds to the processing of step S3208. On the other hand, in the case where the message type=not the statistics acquisition instruction message 1000 and the message type=the inter-task message 900 (step S3207: No), the node device 201 proceeds to the processing of step S3301 of FIG. 33.

In step S3208, the node device 201 transmits the task statistical information to the information processing device 100 (step S3208). Then, the node device 201 terminates the reception processing.

In FIG. 33, the node device 201 determines whether the destination task is a task possessed by the local node device 201 (step S3301).

Here, in the case where the destination task is a task possessed by the local node device 201 (step S3301: Yes), the node device 201 proceeds to the process of step S3302. On the other hand, in the case where the destination task is not the task possessed by the local node device 201 (step S3301: No), the node device 201 proceeds to the processing of step S3303.

In step S3302, node device 201 transfers the message to another node device 201 having the destination task (step S3302). Then, the node device 201 terminates the reception processing.

In step S3303, the node device 201 determines whether the task possessed by the local node device 201 is waiting for activation (step S3303).

Here, in the case where the task possessed by the local node device 201 is waiting for activation (step S3303: Yes), the node device 201 proceeds to the processing of step S3304. On the other hand, in the case where the task possessed by the local node device 201 is not waiting for activation (step S3303: No), the node device 201 proceeds to the processing of step S3305.

In step S3304, the node device 201 accumulates messages (step S3304). Then, the node device 201 terminates the reception processing.

In step S3305, the node device 201 executes the execution processing to be described later in FIG. 34 (step S3305). Then, the node device 201 terminates the reception processing.

(Execution Processing Procedure)

Next, an example of the execution processing procedure executed by the node device 201 will be described with reference to FIG. 34. The execution processing is implemented by, for example, the CPU 1701, the storage area such as the memory 1702 or the recording medium 1705, and the network I/F 1703 illustrated in FIG. 17.

Figure 34:
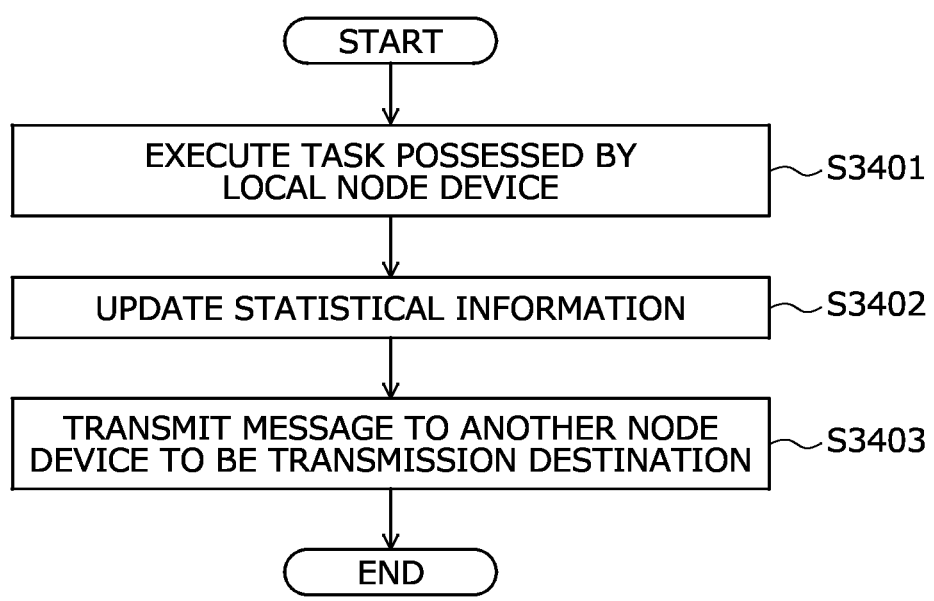
FIG. 34 is a flowchart illustrating an example of an execution processing procedure.

FIG. 34 is a flowchart illustrating an example of the execution processing procedure. In FIG. 34, the node device 201 executes the task possessed by the local node device 201 (step S3401).

Next, the node device 201 updates the statistical information in the case where processing of transmitting a message is present (step S3402). Then, in the case where processing of transmitting a message is present, the node device 201 transmits the message to another node device 201 as the transmission destination (step S3403). After that, the node device 201 terminates the execution processing.

(Selection Processing Procedure)

Next, an example of the selection processing procedure executed by the information processing device 100 will be described with reference to FIG. 35. The selection processing is implemented by, for example, the CPU 501, the storage area such as the memory 502 or the recording medium 505, and the network I/F 503 illustrated in FIG. 5.

Figure 35:
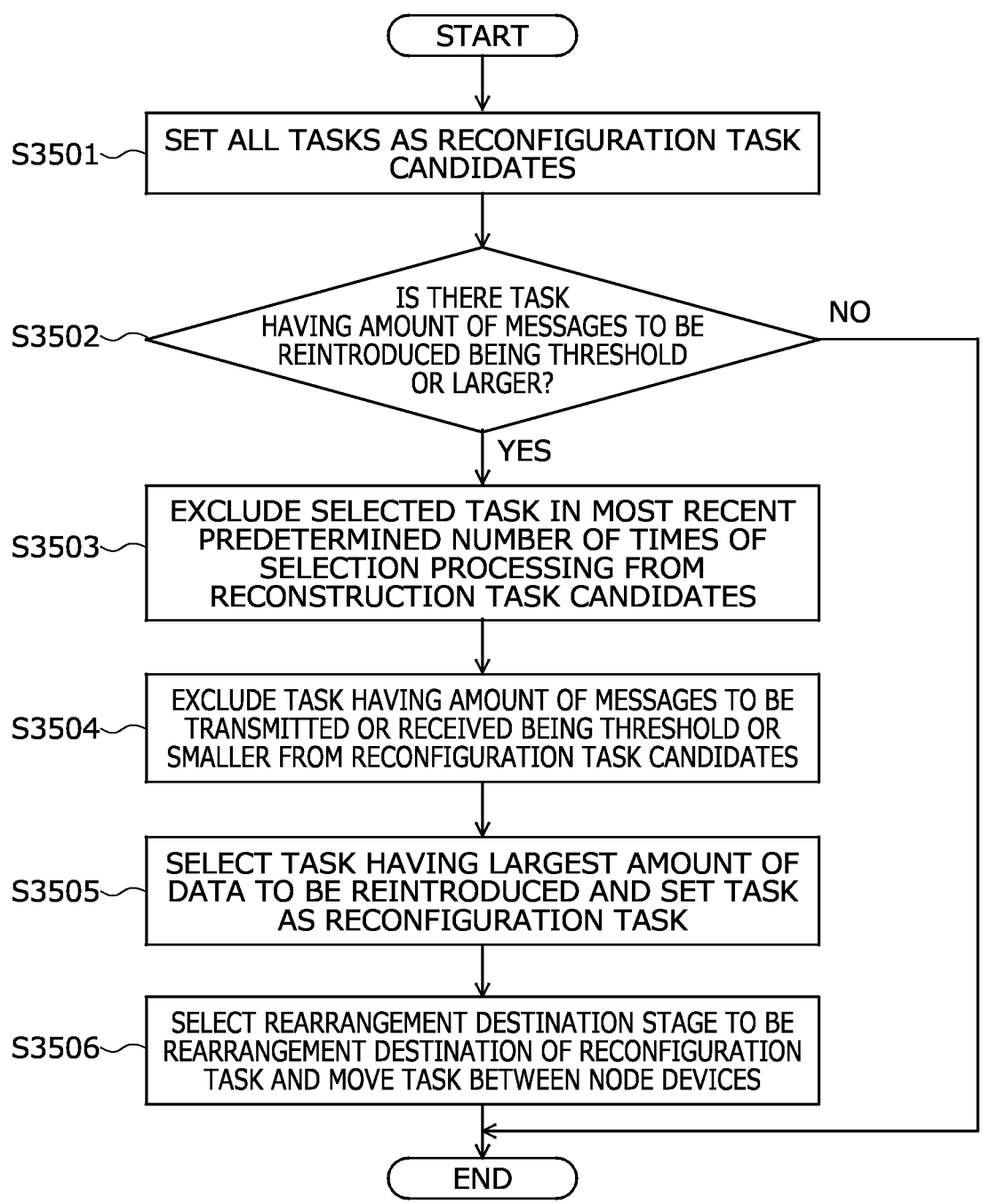
FIG. 35 is a flowchart illustrating an example of a selection processing procedure.

FIG. 35 is a flowchart illustrating an example of the selection processing procedure. In FIG. 35, the information processing device 100 sets all the tasks as the reconfiguration task candidates (step S3501).

Next, the information processing device 100 determines whether there is a task having the amount of messages to be reintroduced being the threshold or higher (step S3502).

Here, in the case where there is no task having the amount of messages to be reintroduced being the threshold or higher (step S3502: No), the information processing device 100 terminates the selection processing. On the other hand, in the case where there is a task having the amount of messages to be reintroduced being the threshold or higher (step S3502: Yes), the information processing device 100 proceeds to the processing of step S3503.

In step S3503, the information processing device 100 excludes the task selected in the most recent predetermined number of times of the selection processing of the reconfiguration task candidates from the reconfiguration task candidates (step S3503).

Next, the information processing device 100 excludes the task having the amount of messages to be transmitted or received being the threshold or smaller among the reconfiguration task candidates from the reconfiguration task candidates (step S3504). Then, the information processing device 100 selects the task having the largest amount of data to be reintroduced from the reconfiguration task candidates and sets the task as the reconfiguration task (step S3505).

Next, the information processing device 100 selects the rearrangement destination stage to be the rearrangement destination of the set reconfiguration task from the plurality of stages, and moves the task between the node devices 201 (step S3506). Then, the information processing device 100 terminates the selection processing.

(Rearrangement Processing Procedure)

Next, an example of the rearrangement processing procedure executed by the node device 201 will be described with reference to FIGS. 36 and 37. The rearrangement processing is implemented by, for example, the CPU 1701, the storage area such as the memory 1702 or the recording medium 1705, and the network I/F 1703 illustrated in FIG. 17.

Figure 36:
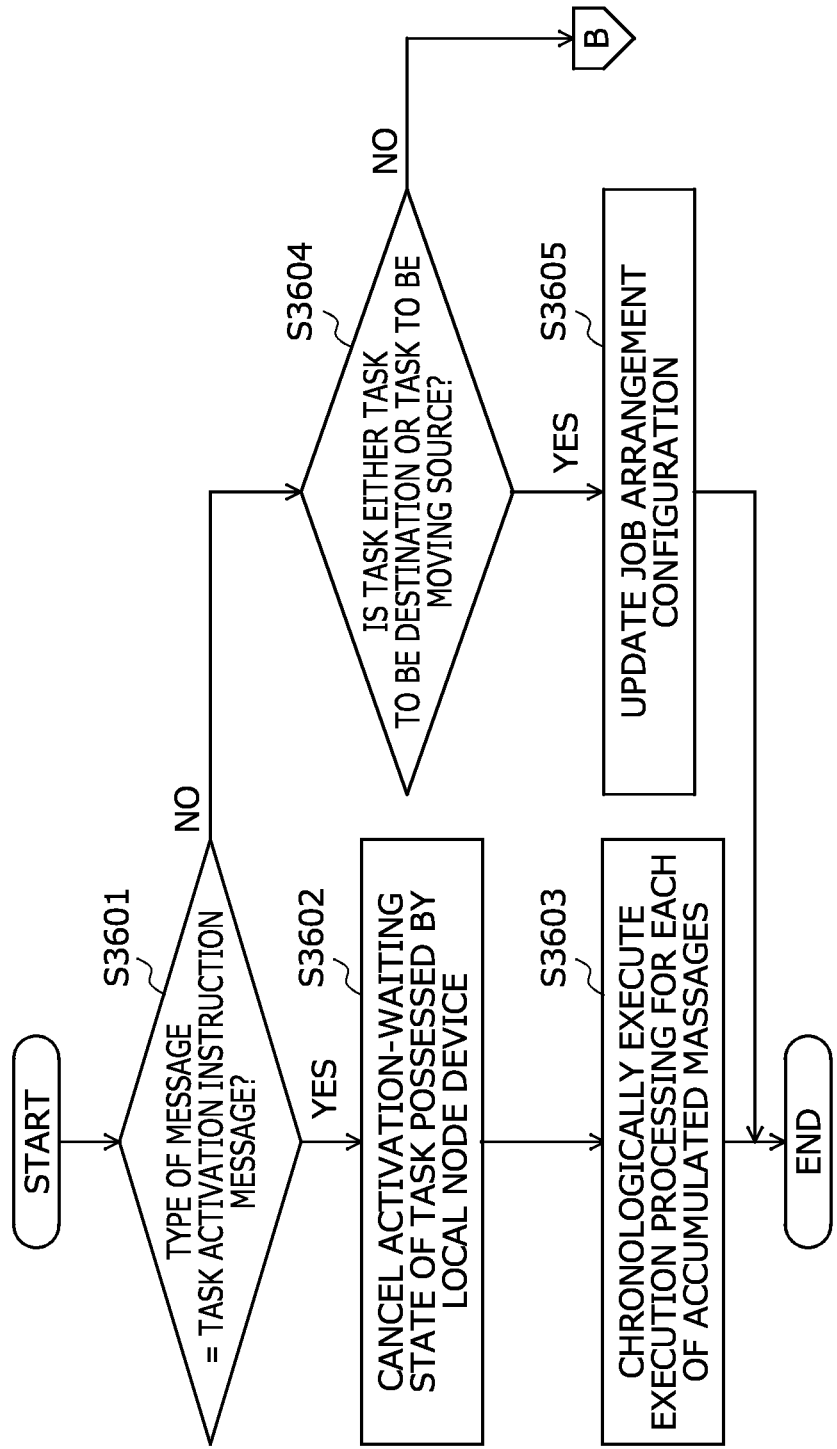
FIG. 36 is a flowchart (No. 1) illustrating an example of a rearrangement processing procedure.
Figure 37:
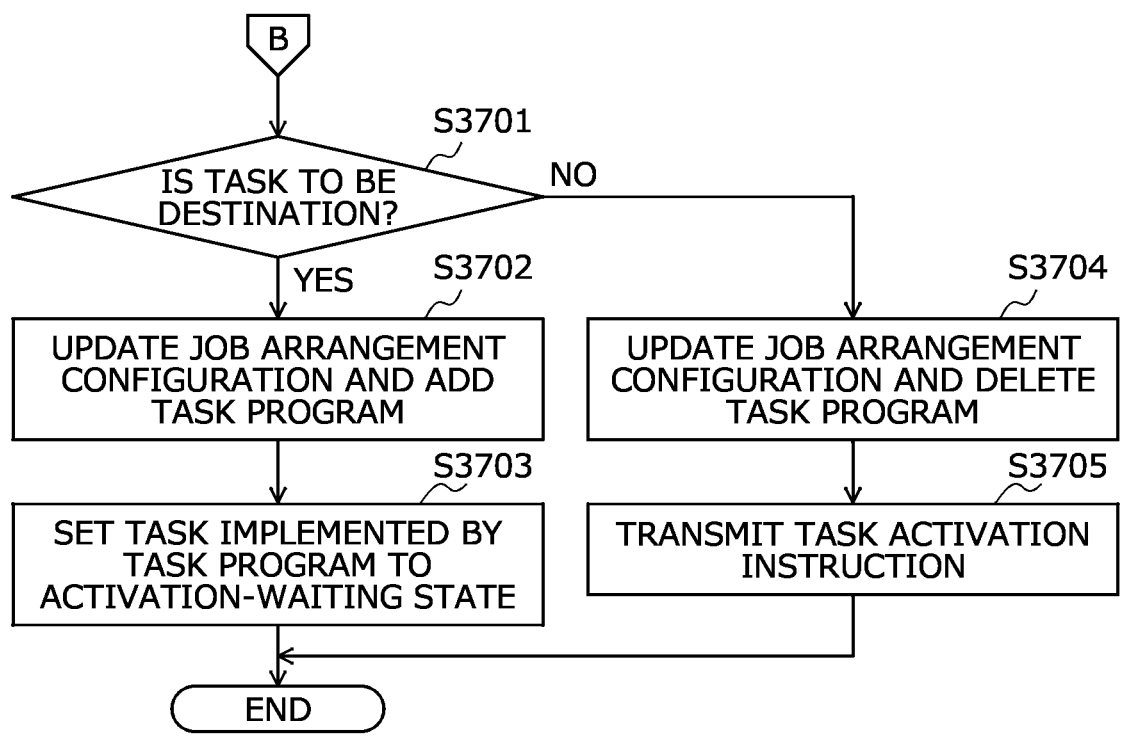
FIG. 37 is a flowchart (No. 2) illustrating an example of the rearrangement processing procedure.

FIGS. 36 and 37 are flowcharts illustrating an example of the rearrangement processing procedure. In FIG. 36, the node device 201 determines whether the message type=the task activation instruction message 1400 (step S3601).

Here, in the case where the message type=the task activation instruction message 1400 (step S3601: Yes), the node device 201 proceeds to the processing of step S3602. On the other hand, in the case where the message type=not the task activation instruction message 1400 and the message type=the task moving instruction message 1300 (step S3601: No), the node device 201 proceeds to the processing of step S3604.

In step S3602, the node device 201 cancels the activation-waiting state of the task possessed by the local node device 201 (step S3602). Next, the node device 201 executes the execution processing illustrated in FIG. 34 for each of the accumulated messages in chronological order (step S3603). Then, the rearrangement processing is terminated.

In step S3604, the node device 201 determines whether the task possessed by the local node device 201 is either the task to be the destination or the task to be the moving source (step S3604).

Here, in the case where the task possessed by the local node device 201 is either the task to be the destination or the task to be the moving source (step S3604: Yes), the node device 201 proceeds to the processing of step S3605. Here, in the case where the task possessed by the local node device 201 is neither the task to be the destination nor the task to be the moving source (step S3604: No), the node device 201 proceeds to the processing of step S3701 of FIG. 37.

In step S3605, node device 201 updates the job arrangement configuration (step S3605). Then, the node device 201 terminates the rearrangement processing.

In FIG. 37, the node device 201 determines whether the task possessed by the local node device 201 is the task to be the destination (step S3701).

Here, in the case where the task possessed by the local node device 201 is the task to be the destination (step S3701: Yes), the node device 201 proceeds to the process of step S3702. On the other hand, in the case where the task possessed by the local node device 201 is not the task to be the destination (step S3701: No), the node device 201 proceeds to the processing of step S3704.

In step S3702, node device 201 updates the job arrangement configuration and adds the task program (step S3702). Next, the node device 201 sets the task executed by the added task program to the activation-waiting state (step S3703). Then, the node device 201 terminates the rearrangement processing.

In step S3704, node device 201 updates the job arrangement configuration and deletes the task program (step S3704). Next, the node device 201 transmits a task activation instruction to the node device 201 having the task to be the destination (step S3705). Then, the node device 201 terminates the rearrangement processing.

As described above, the information processing device 100 can acquire a plurality of patterns to be candidates for the arrangement order of a plurality of tasks from upstream to downstream of a stream in the case of executing the plurality of tasks using the stream processing format. The information processing device 100 can specify, for each of the plurality of acquired patterns, the amount of data to be reintroduced from one task of the plurality of tasks to another task located upstream side of the stream with respect to the one task. According to the information processing device 100, the arrangement order of the plurality of tasks from upstream to downstream of the stream can be determined from among the plurality of patterns based on the specified amount of data to be reintroduced for each of the patterns. Thereby, the information processing device 100 enables use of the pattern for reducing the processing load applied on the stream processing system.

The information processing device 100 can cause the stream processing platform to execute the plurality of tasks, using the stream processing format, in the state of arranging the plurality of tasks from upstream to downstream of the stream according to the determined pattern. Thereby, the information processing device 100 can reduce the processing load applied on the stream processing system.

The information processing device 100 can specify, for each of the plurality of acquired patterns, the amount of data to be transmitted from one task of the plurality of tasks to another task located downstream side of the stream with respect to the one task. According to the information processing device 100, the arrangement order of the plurality of tasks from upstream to downstream of the stream can be determined from among the plurality of patterns based on the specified amount of data to be reintroduced and the specified amount of data to be transmitted for each of the patterns. Thereby, the information processing device 100 can accurately estimate the processing load applied on the stream processing system and can effectively reduce the processing load applied on the stream processing system.

The information processing device 100 can further determine the pattern indicating the arrangement order of the plurality of tasks from upstream to downstream of the stream from among the plurality of patterns based on the coefficient representing the magnitude of the cost in transmitting data to a task. Thereby, the information processing device 100 can more accurately estimate the processing load applied on the stream processing system.

The information processing device 100 can further determine the pattern indicating the arrangement order of the plurality of tasks from upstream to downstream of the stream from among the plurality of patterns based on the coefficient representing the magnitude of the cost in reintroducing data to a task. Thereby, the information processing device 100 can more accurately estimate the processing load applied on the stream processing system.

The information processing device 100 can select any one task of the plurality of tasks. The information processing device 100 can acquire a plurality of patterns to be candidates for the arrangement order of a plurality of tasks from upstream to downstream of a stream and each having a different position of the one task in the case of executing the plurality of tasks using the stream processing format. As a result, the information processing device 100 can limit the number of patterns to be referred to and efficiently perform processing.

The information processing device 100 can select one of the plurality of tasks other than the task selected in any of past periods. Thereby, the information processing device 100 can acquire the pattern based on the selected task and expected to reduce the processing load applied on the stream processing system.

The information processing device 100 can use the period from a time point selected a predetermined number of times before the present time point among a plurality of time points when selecting a task included in the plurality of tasks in the past to the present time point, as the any period of past periods. Thereby, the information processing device 100 can acquire the pattern based on the selected task and expected to reduce the processing load applied on the stream processing system.

The information processing device 100 can select one of the plurality of tasks in which at least either the amount of data to be transmitted to another task or the amount of data to be received from another task satisfies the condition. Thereby, the information processing device 100 can acquire the pattern based on the selected task and expected to reduce the processing load applied on the stream processing system.

The information processing device 100 can select one of the plurality of tasks in which at least either the amount of data to be reintroduced to another task or the amount of data to be reintroduced from another task satisfies the condition. Thereby, the information processing device 100 can acquire the pattern based on the selected task and expected to reduce the processing load applied on the stream processing system.

The information processing device 100 can determine whether the amount of data to be reintroduced from each task of the plurality of tasks into another task satisfies the condition. The information processing device 100 can determine the pattern indicating the arrangement order of the plurality of tasks from upstream to downstream of the stream from among the plurality of patterns in the case where the amount of data to be reintroduced from at least one task to another task satisfies the condition. Thereby, the information processing device 100 can reduce the processing amount in the case where reduction in the processing load applied on the stream processing system is difficult.

The information processing device 100 can use the pattern for arranging a plurality of tasks on a plurality of stages from upstream to downstream of the stream as the candidates of the arrangement order of the plurality of tasks from upstream to downstream of the stream. As a result, the information processing device 100 can easily handle the arrangement order of the plurality of tasks along the stream.

Note that the information processing method described in the present embodiment may be implemented by executing a prepared program on a computer such as a personal computer (PC) or a workstation. The information processing program described in the present embodiment is executed by being recorded on a computer-readable recording medium and being read from the recording medium by the computer. The recording media are hard disks, flexible disks, compact disc (CD)-ROM, magneto-optical disc (MO), digital versatile disc (DVD), or the like. Furthermore, the information processing program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method comprising:
    by a processor coupled to a memory,
        acquiring, from the memory, a plurality of patterns of a plurality of tasks to be candidates of an arrangement order of the plurality of tasks from upstream to downstream of a first stream in a case of executing the plurality of tasks using a stream processing format;
        specifying, from the memory storing task information, for a pattern of the plurality of acquired patterns, an amount of data to be reintroduced to the first stream, through a second stream outside of the first stream, from one task of the plurality of tasks to another task of the plurality of tasks located upstream side of the first stream with respect to the one task; and
        determining a first pattern, from among the plurality of acquired patterns, that indicates a rearranged order of a plurality of tasks from upstream to downstream of the first stream, based on the specified amount of data to be reintroduced for the first pattern through the second stream.

2. The information processing method according to claim 1, the method further comprising:
    causing a stream processing platform to execute the plurality of tasks, using the stream processing format, in a state of arranging the plurality of tasks from upstream to downstream of the stream according to the determined pattern.

3. The information processing method according to claim 1, the method further comprising:
    specifying, for a pattern of the plurality of acquired patterns, an amount of data to be transmitted from one task of the plurality of tasks to another task located downstream side of the stream with respect to the one task,
    wherein the determining includes determining a second pattern that indicates a rearranged order of a plurality of tasks based on the specified amount of data to be reintroduced and the specified amount of data to be transmitted for the second pattern through the second stream.

4. The information processing method according to claim 3, wherein the determining further includes
    determining the second pattern that indicates the rearranged order of the plurality of tasks based on a coefficient that represents a magnitude of a cost in transmitting data to a task among the tasks in the first stream.

5. The information processing method according to claim 1, wherein the determining further includes determining the first pattern that indicates the rearranged order of the plurality of tasks based on a coefficient that represents a magnitude of a cost in reintroducing data to a task among the tasks in the first stream.

6. The information processing method according to claim 1, wherein the acquiring includes
    selecting one task from the plurality of tasks, and acquiring a plurality of patterns to be candidates of the rearranged order of the plurality of tasks from upstream to downstream of the stream in a case of executing the plurality of tasks using the stream processing format, the plurality of patterns each of which has a different position of the one task.

7. The information processing method according to claim 6, wherein the acquiring includes
selecting the one task that is other than a task selected in one period of past periods from the plurality of tasks.

8. The information processing method according to claim 7, wherein the one period is a period from a time point selected a predetermined number of times before a present time point among a plurality of time points when selecting a task included in the plurality of tasks in the past to the present time point.

9. The information processing method according to claim 6, wherein the acquiring includes
selecting the one task from the plurality of tasks in which at least either an amount of data to be transmitted to another task or an amount of data to be received from another task satisfies a predetermined condition.

10. The information processing method according to claim 6, wherein the acquiring includes
selecting one task from the plurality of tasks in which at least either an amount of data to be reintroduced to another task or an amount of data to be reintroduced from another task satisfies a predetermined condition.

11. The information processing method according to claim 1, wherein the determining includes,
in a case where the specified amount of data to be reintroduced from at least one task of the plurality of tasks to another task satisfies a condition, determining the first pattern that indicates the rearranged order of the plurality of tasks based on the specified amount of data that satisfies the condition, to be reintroduced for the first pattern.

12. The information processing method according to claim 1, wherein the pattern is a pattern of arranging the plurality of tasks on a plurality of stages from upstream to downstream of the stream.

13. A non-transitory computer-readable storage medium having stored an information processing program causing a computer to perform a process comprising:
acquiring, from a memory, a plurality of patterns of a plurality of tasks to be candidates of an arrangement order of the plurality of tasks from upstream to downstream of a first stream in a case of executing the plurality of tasks using a stream processing format;
specifying, from the memory storing task information, for a pattern of the plurality of acquired patterns, an amount of data to be reintroduced to the first stream, through a second stream outside of the first stream, from one task of the plurality of tasks to another task of the plurality of tasks located upstream side of the first stream with respect to the one task; and
determining, from among the plurality of acquired patterns, a pattern that indicates a rearranged order of a plurality of tasks from upstream to downstream of the first stream, based on the specified amount of data to be reintroduced for the pattern through the second stream.

* * * * *